US006920303B2

(12) United States Patent
Yamanaka et al.

(10) Patent No.: US 6,920,303 B2
(45) Date of Patent: Jul. 19, 2005

(54) COLOR OFFSET DETECTING APPARATUS AND METHOD

(75) Inventors: Tetsuo Yamanaka, Tokyo (JP); Kazuhiko Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/452,212

(22) Filed: Jun. 3, 2003

(65) Prior Publication Data

US 2004/0033090 A1 Feb. 19, 2004

(51) Int. Cl.[7] ........................ G03G 15/01; B41J 2/385; G01D 15/06

(52) U.S. Cl. ........................ 399/301; 347/116

(58) Field of Search ........................ 399/49, 299, 301, 399/302, 303, 313; 347/116

(56) References Cited

U.S. PATENT DOCUMENTS

| | | | |
|---|---|---|---|
| 5,486,909 A | 1/1996 | Takenaka et al. | |
| 5,489,747 A | 2/1996 | Takenaka et al. | |
| 5,523,823 A * | 6/1996 | Ashikaga | 347/116 X |
| 5,617,191 A | 4/1997 | Murakami et al. | |
| 5,625,438 A | 4/1997 | Sugiyama et al. | |
| 5,625,440 A | 4/1997 | Matsumae et al. | |
| 5,625,441 A | 4/1997 | Sugiyama et al. | |
| 5,666,625 A | 9/1997 | Komatsubara et al. | |
| 5,689,782 A | 11/1997 | Murakami et al. | |
| 5,697,026 A | 12/1997 | Matsumae et al. | |
| 5,708,942 A | 1/1998 | Sugiyama et al. | |
| 5,717,981 A | 2/1998 | Yamanaka | |
| 5,768,665 A | 6/1998 | Yamanaka et al. | |
| 5,802,422 A * | 9/1998 | Hokari | 347/116 X |
| 5,826,144 A | 10/1998 | Takenaka et al. | |
| 5,845,183 A | 12/1998 | Sugiyama et al. | |
| 5,875,380 A | 2/1999 | Iwata et al. | |
| 5,879,752 A | 3/1999 | Murakami et al. | |
| 5,897,243 A | 4/1999 | Komatsubara et al. | |
| 5,930,561 A | 7/1999 | Hosokawa et al. | |

(Continued)

FOREIGN PATENT DOCUMENTS

| | | |
|---|---|---|
| EP | 0 919 882 | 6/1999 |
| JP | 6-144631 | 5/1994 |
| JP | 8-248730 | 9/1996 |
| JP | 2573855 | 10/1996 |
| JP | 11-65208 | 3/1999 |
| JP | 11-102098 | 4/1999 |
| JP | 11-249380 | 9/1999 |
| JP | 2000-112205 | 4/2000 |

OTHER PUBLICATIONS

U.S. Appl. No. 10/452,212, filed Jun. 3, 2003, Yamanaka et al.

U.S. Appl. No. 10/861,491, filed Jun. 7, 2004, Kobayashi.

U.S. Appl. No. 10/893,391, filed Jul. 19, 2004, Yokoyama et al.

*Primary Examiner*—Sandra L. Brase

(74) *Attorney, Agent, or Firm*—Oblon, Spivak, McClelland, Maier & Neustadt, P.C.

(57) ABSTRACT

An apparatus for forming a plurality of different color visual images on a photosensitive member is provided. A transfer medium driven by a driving roller and receives the plurality of different color visual images at a transfer section from the photosensitive member. The transfer medium superimposes and transfers the different color visual images to a transfer sheet a plurality of mark sets each formed from a set of different color marks (Bk, Y, M, C) aligned in a movement direction is formed on the transfer medium. Respective marks are detected by a sensor. An average of displacements of respective different color marks from a reference position is then calculated. The sensor is positioned being distanced from the transfer section by a prescribed length. The prescribed length is calculated by multiplying a conveyance length the transfer medium travels when the driving roller rotates once by an integer number.

6 Claims, 25 Drawing Sheets

U.S. PATENT DOCUMENTS

| | | | | | |
|---|---|---|---|---|---|
| 5,946,537 | A | * | 8/1999 | Nakayasu et al. | 399/301 |
| 6,033,818 | A | | 3/2000 | Sugiyama et al. | |
| 6,038,423 | A | | 3/2000 | Tagawa et al. | |
| 6,163,666 | A | | 12/2000 | Hosokawa et al. | |
| 6,167,221 | A | | 12/2000 | Kobayashi | |
| 6,188,418 | B1 | * | 2/2001 | Hata | 347/116 |
| 6,212,343 | B1 | | 4/2001 | Hosokawa et al. | |
| 6,295,435 | B1 | * | 9/2001 | Shinohara et al. | 399/301 |
| 6,603,495 | B2 | * | 8/2003 | Hayakawa | 347/116 |
| 6,626,101 | B2 | * | 9/2003 | Kajiwara et al. | 347/116 X |
| 2004/0033090 | A1 | | 2/2004 | Yamanaka et al. | |

* cited by examiner

COLOR OFFSET DETECTING APPARATUS AND METHOD

BACKGROUND OF THE INVENTION

Field of the Invention

The present invention relates to a color image forming apparatus capable of forming a color image by superposing different color visual images on a photosensitive member (PC member) and a transfer sheet, and in particular, to a color offset detecting apparatus and method capable of detecting displacements of respective color visual images (i.e., color offset).

Color-offset detection technology has been disclosed in several official gazettes, such as Japanese Patent No. 2573855, Japanese Application Laid Open Nos. 11-65208, 11-102098, 11-249380 and 2000-112205, etc. According to the technology, a transfer sheet is supported and conveyed along the lines of respective photoconductive drums (PC drums). A plurality of color toner marks (e.g. horizontal Bk, Y, C and M color marks and slant Bk, Y, C and M color marks) of color offset detection use are formed on a transfer belt almost at its widthwise ends as alignment patterns. The transfer belt transfers the toner image to a transfer sheet. A pair of optical sensors read the respective color toner marks and generate detection signals. Each mark position is calculated based upon the detection signals. Specifically, a displacements "dy" of respective color marks in a sub scanning direction "y" (i.e., in a transfer belt moving direction) from a reference position, displacements "dx" in a main scanning direction "x" (i.e., in a widthwise direction of a transfer belt), displacements "dLx" of writing start and end positions of a main scanning line, and skews "dSq" of the main scanning lines are calculated.

The optical sensor such as a photoelectric transfer element such as a phototransistor receives a reflected or transmitted light from the transfer belt via a slit, and converts the light into a voltage (as an analog detection signal). An amplifying circuit calibrates the voltage within a prescribed level. Thus, when none of color mark exists in front of the slit, a detection signal of five volts, for example, is obtained as a logic high level. In contrast, when any color mark exists and entirely covers the surface of the slit, a detection signal of zero volts, for example, is obtained as a logic low level.

However, since the transfer belt moves at a constant speed, a level of a detection signal gradually decreases when a leading edge of the mark enters into a field of view of the optical sensor within a slit. The level remains to be zero volts when the mark entirely covers the surface of the slit. The level of a detection signal gradually increases, when a trailing edge of the mark enters into the field of view of the optical sensor within the slit, and returns to the five volt level when the mark has entirely passed through the slit. This represents the ideal case, however, the detection signal fluctuates in level as described above.

In such a situation, when 2.5 volt as a medium value of zero and five volts is set as a threshold, for example, and detected signal is then digitized, thereby a binary signal distribution is obtained in chronological order corresponding to an L-mark. Specifically, the detection signal is digitized by the comparator, a number of clocks, timing pulses, or sampling pulses which are generated in proportion to a moving speed of the transfer belt is counted to be accumulated, and counted values are stored every time the output of the comparator changes from High to Low and vice a visa so as to recognize positions of the visual color marks.

However, a level of the detected signal of the visual color mark shifts, and frequently largely varies relative to a short cycle per a mark color (i.e., toner type). Further, high frequency noise can be suppressed by filtering the detection signal with a low pass filter.

However, when shifting a cutoff frequency to a lower side in order to improve such suppression, a pulse width of a binary signal which indicates logic Low in correspondence to a visual color mark largely varies, thereby mark pattern recognition and, in particular, positional identification of the visual color mark is difficult. These problems are serious in proportion to a level of stain and damage of the transfer belt. As a result, even if a life for transfer use is long, a mark pattern for color matching use becomes quickly difficult to detect.

To remedy this, it has been attempted to repeatedly convert the detection signals with an A/D converter in a memory in a short cycle. Then, a frequency of the detection signal is analyzed in accordance with data of the detected signals, and correlation with a reference waveform is determined. Specifically, data band positions corresponding to the reference waveform are fixed and a mark pattern is recognized.

However, data to be selected is voluminous and requires a large capacity memory. In addition, a pattern identification operation is complex and requires a long operational time period. Further, a position of a color mark tends to vary in a transfer belt moving direction. For example, a color mark position shifts when rotational unevenness or eccentricity arises either in the transfer belt or its driving roller.

In order to suppress an error in detecting a color offset, which error is caused by the mark positional variance, Japanese Patent Application Laid Open No. 141-65208: The same color marks are formed twice on PC member in a half cycle thereof. Respective amounts of positional displacements of those color marks from reference positions are detected, and an average of detected values is calculated as a displacement. In addition, such a displacement is repeatedly detected a number of "n" times and an average (i.e., one n-th) is obtained.

Further, the Japanese Patent Application Laid Open No. 11-65208 proposes:. A mark set formed from plural different color marks is formed in a cycle of quarter peripheral length, and thereby four sets of the different color marks are formed around one circuit of the PC drum. These color marks are transferred to a transfer belt, and displacements of respective marks from reference positions on the transfer belt are detected. Finally, an average of displacements of the same color marks (i.e., four marks) are calculated. Subsequently, toner images of the color marks and stain on the transfer belt are wiped by a blade of a cleaning apparatus.

However, since wiping is imperfect if the transfer belt passes the blade only once, and a sensor detects a residual mark image, detection of color offset is disturbed as the residual mark image substantially disappears when the transfer belt is rotated plural times.

However, if the same color marks are formed plural times, a long cycle is necessarily placed when idle running of a transfer belt is performed plural times. As a result, detection of the color offset is time intensive.

Further, if the PC drum includes eccentricity, its radius is maximized at a prescribed position, and minimized at a position forwarding by half circle. If an ellipse shape deformation is included, a radius is almost maximized at a position forwarding by half circle. Accordingly, the average does not precisely represents practical displacements when the same color marks are formed in a half or quarter cycle. As a result, a credibility of displacement detection is low.

SUMMARY OF THE INVENTION

The present invention has been made in view of such problems and to address and resolve such problems. Accordingly, it is an object of the present invention to provide a novel color offset detecting method and apparatus.

The method includes the step of forming different color visual images on a photosensitive member. A transfer medium is provided and driven by a driving roller and configured to receive at a transfer section from the photosensitive member and superpose the different color visual images. The transfer medium transfers the different color visual images to a transfer sheet. Then, a plurality of mark sets are formed on the transfer medium. Each of the mark sets is formed from a set of different color marks (Bk, Y, M, C) aligned in a movement direction. Respective marks are detected by a sensor. An average of displacements of respective different color marks from a reference position is then calculated. The sensor is distanced from the transfer section by a prescribed length. The prescribed length is calculated by multiplying a conveyance length that the transfer medium travels when the driving roller rotates once by an integer number.

It is to be understood that both the foregoing general description of the invention and the following detailed description are exemplary, but are not restrictive of the invention.

BRIEF DESCRIPTION OF THE SEVERAL VIEWS OF THE DRAWINGS

A more complete appreciation of the present invention and many of the attendant advantages thereof will be readily obtained as the same becomes better understood by the following detailed description when considered in connection with the accompanying drawings, wherein:

FIG. 8BB is a flowchart illustrating a color-matching operation performed in FIG. 8A;

DETAILED DESCRIPTION OF THE PRESENT INVENTION

Figure 1:
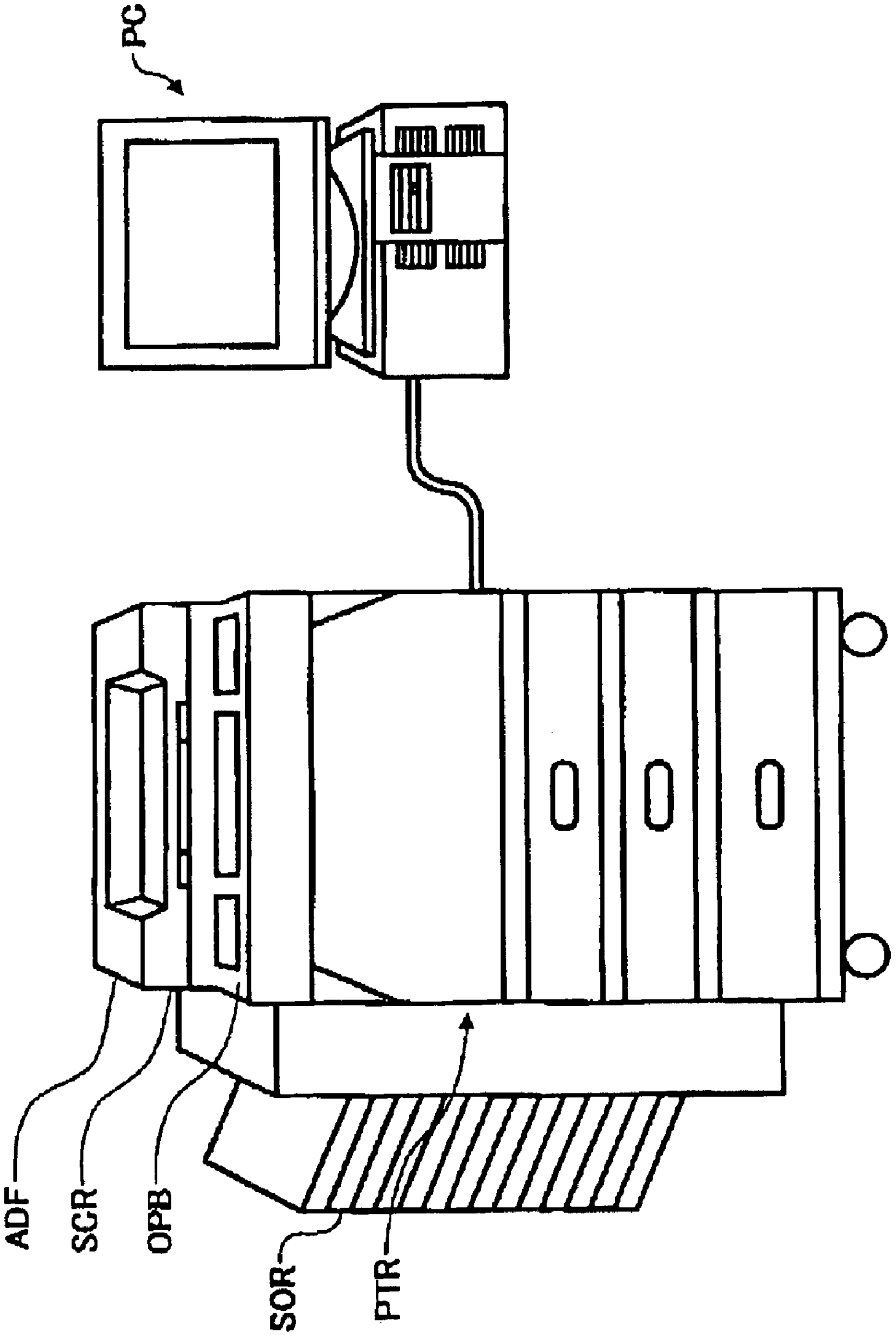
FIG. 1 is a perspective view illustrating an exemplary embodiment of a color copier.

Referring now to the drawings, wherein like reference numerals and marks designate like or corresponding parts throughout several figures, in particular, in FIG. 1, an image forming apparatus is illustrated as a multifunctional digital color copier including a color printer (PTR), an image scanner (SCR), an automatic document feeding apparatus (ADF), and a sorter (SOR) or the like. In operation, the image forming apparatus produces a copy of an original document and is capable of printing an image when receiving print data from a host device such as a personal computer (PC) as image information through a communications interface (not shown).

Figure 2:
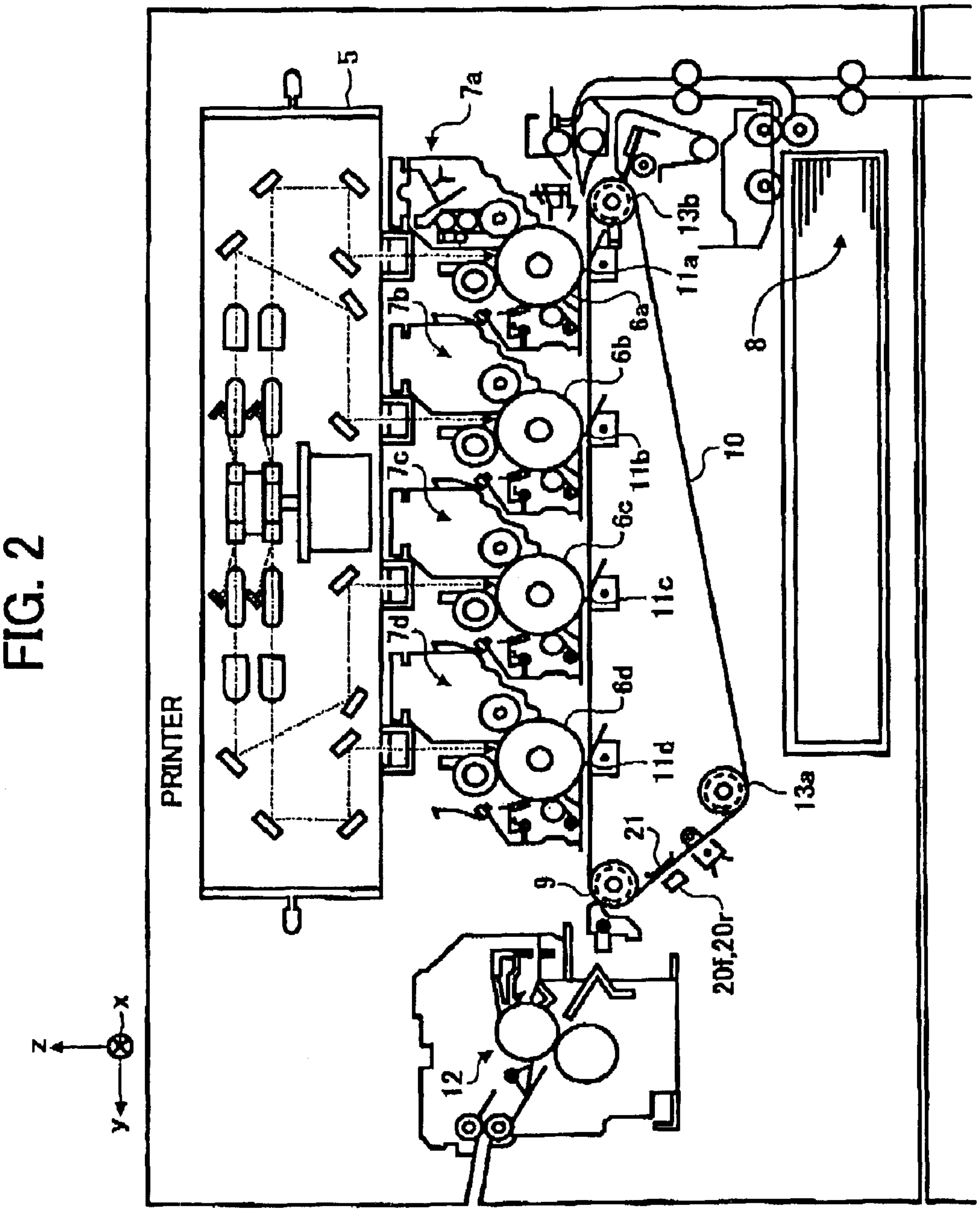
FIG. 2 is a schematic diagram illustrating an interior mechanism of a printer illustrated in FIG. 1.
Figure 3:
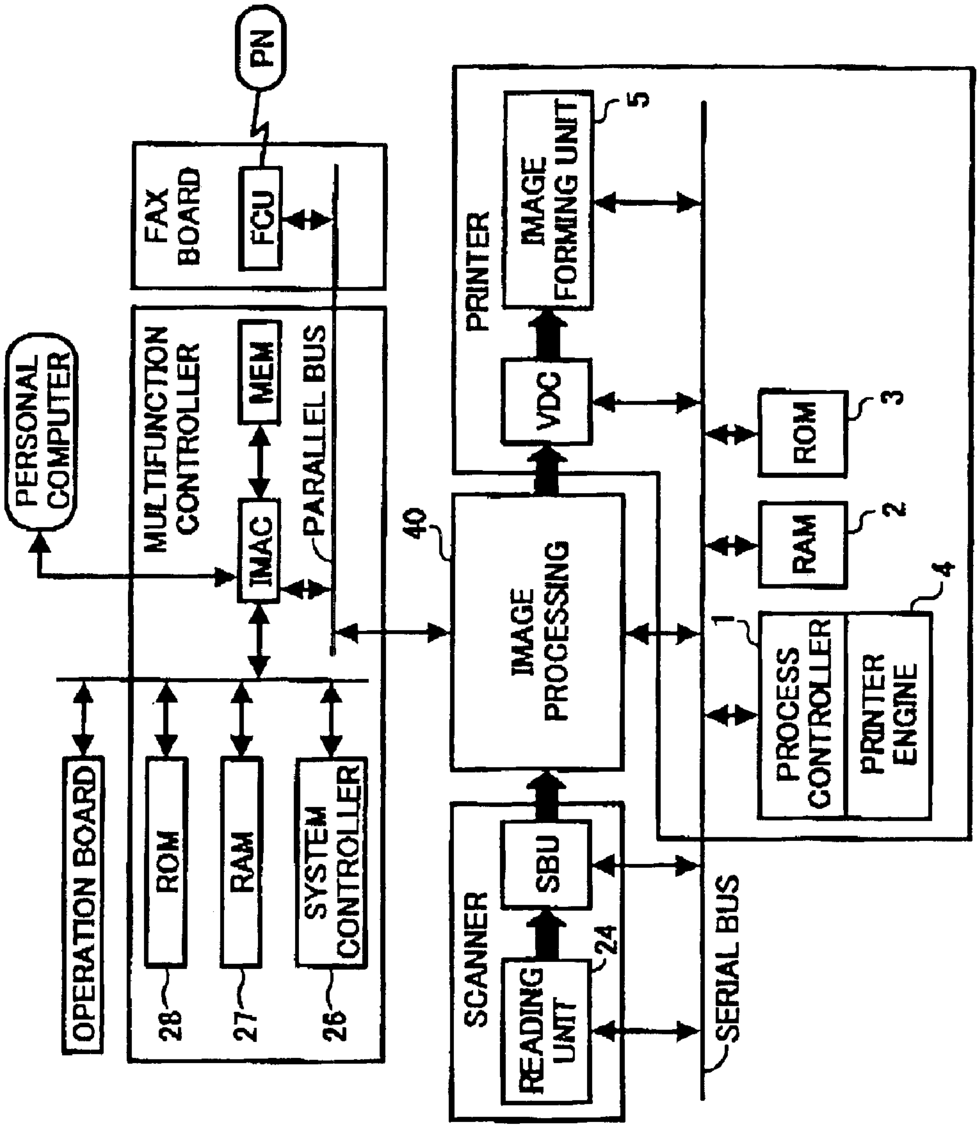
FIG. 3 is a high level block diagram illustrating an electric system of the color copier illustrated in FIG. 1.

Each color image data generated by the scanner is converted into image data for color printing use, such as black (Bk), yellow (Y), cyan (C), magenta (M) by an image processing section 40 as illustrated in FIG. 3. The image data is then transmitted to an image forming unit or "writing unit" 5 serving as an exposing apparatus of the printer. As illustrated in FIG. 2, the writing unit 5 irradiates and scans respective PC drums 6*a*, 6*b*, 6*c* and 6*d* for M, C, Y and Bk printing use with a laser beam modulated by image data for M, C, Y and Bk printing use in accordance with printing image data, thereby forming a latent image thereon. The latent images are then developed by respective developing devices 7*a*, 7*b*, 7*c* and 7*d* with M, C, Y and Bk toners to be corresponding toner images (i.e.,visual images), respectively.

Further, a transfer sheet is conveyed from a sheet cassette 8 onto a transfer belt 10 included in a transfer belt unit. Respective color images developed on the drum members are transferred and superposed on the transfer sheet one after another by transfer devices 11*a*, 11*b*, 11*c* and 11*d*. The super posed image on the transfer sheet is then fixed thereto by a fixing apparatus 12 and is ejected from an image forming apparatus housing.

The transfer belt 10 is formed from a translucent endless belt supported by a driving roller 9, tension roller 13*a* and driven roller 13*b*. Since the tension roller 13*a* pushes the belt 10 up with a spring (not shown), a tension of the belt 10 is substantially constant.

Figure 5:
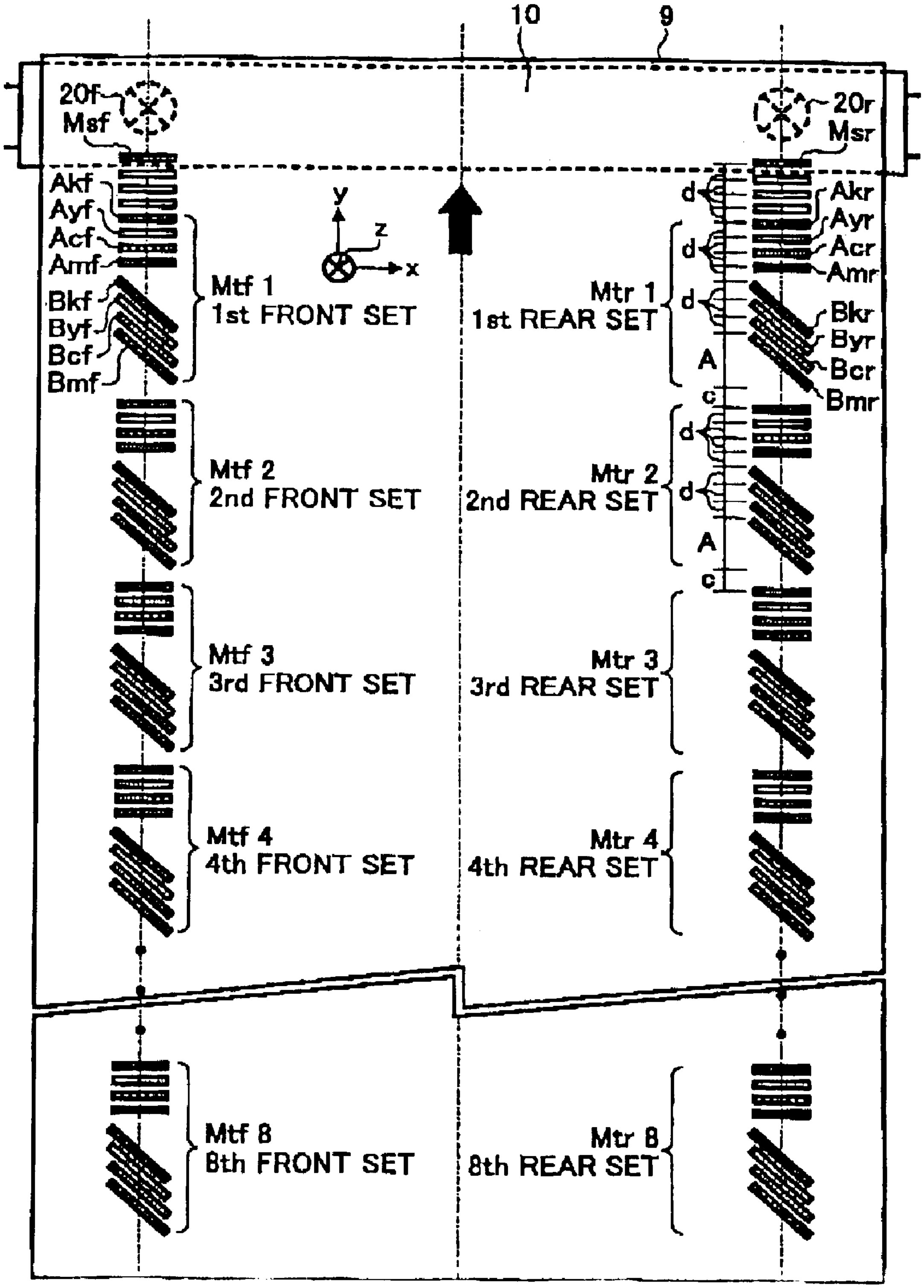
FIG. 5 is a plan view illustrating a transfer belt 10 and a vicinity of a screw attached to the latent image forming unit illustrated in FIG. 4A.

In order to prevent color offset generally caused when the above-mentioned transfer is performed, the color printer writes and develops test patterns for position detection use both front and rear sides on the respective PC drums 6*a*, 6*b*, 6*c* and 6*d* as illustrated in FIG. 5. The test patterns are then transferred to the transfer belt 10 and are detected by a pair of optical sensors 20*f* and 20*r*, respectively. Thereby, writing displacement and inclination and magnification error or the like of the writing unit 5 on the respective PC drums 6*a*, 6*b*, 6*c* and 6*d* can be detected. In addition, a writing time and similar of the writing unit 5 is controlled to be corrected so as to avoid the color-offset cause by these error.

The document scanner (SCR) for optically reading an original document condenses a light irradiated from a lamp and reflected by the original document with a reading unit 24 using a mirror and lens at a photo-acceptance unit as known to those skilled in the art. The photo-acceptance unit of the exemplary embodiment is formed from a CCD and similar and is included in a sensor board unit (SBU). An image signal converted to an electric signal by the photo-acceptance unit is converted to a digital signal (i.e., a read image data) in the SBU, and is then output to the image processing section 40.

A system controller 26 and a process controller 1 communicate with each other via a parallel bus "Pb" and a serial bus "Sb". The image processing section 40 internally performs data format conversion for data interface between the parallel and serial buses "Pb" and "Sb".

The read image data transmitted from the SBU is transferred to the image processing section 40. An image processing operation corrects deterioration of an optical unit and signal caused during quantization to a digital signal (e.g. deterioration of a signal from a scanner unit, distortion of read image data due to a scanner quality), and transfers the image data to a copier function controller MFC. The image processing operation then writes the image data in a memory module MEM, for example, and provides the color printer PTR therewith.

Specifically, the image processing section 40 executes a job storing and reusing read image data in the memory MEM. The image processing section 40 also executes a job, outputting read image data to a video data control section VDC and forming an image in the color printer without storing the image data in the memory MEM. As one example storing read image data in the memory MEM when an original document is to be copied plural times, the reading unit 4 is operated once and read image data is stored in the memory MEM so as to be read therefrom plural times. As another example not using the memory MEM when an original document is to be copied once, the memory MEM may not be employed, because the read image data can be processed as it is for printing. In the exemplary embodiment, the controller MFC includes a RAM 27 and ROM 28 for realizing a copying function.

When the memory MEM is not used, the image processing section 40 applies image-reading correction to read image data, and then performs image processing so as to convert the read image data into area gradation data. Image data subjected to the image processing operation is transferred to the video control section VDC. The video control section VDC applies both a post processing related to dot arrangement and a pulse control reproducing a dot to a signal that is converted into the area gradation data. Then, the writing unit 5 of the color printer forms a reproduction image on a transfer sheet.

When it is stored in the memory MEM and an additional processing such as rotation of an image direction, combining of images, etc. is performed when it is read, image data subjected to image reading correction is transmitted to an image memory access control section IMAC via the parallel bus Pb. The image memory access control section controls image data to access to the memory MEM under a control of the system controller 26, and maps printing use data (e.g. character code/character bit conversion) of an external personal computer PC. The image memory access control section also performs compression and decompression of image data so as to efficiently use the memory MEM. Data transmitted to the access control section IMAC is stored in the memory MEM after being compressed for access therefrom. The read data is decompressed to be primary image data and is returned to the image processing section 40 from the access control section IMAC via the parallel bus Pb.

When returned to the image processing section 40, the image data receives image processing. Then, it receives pulse control so as to form a visual image (i.e., toner image) on a transfer sheet in the writing unit 5.

A facsimile transmitting function as one of copier functions applies an image reading correction to image data read by the document scanner in the image processing section 40, and transfers it to a facsimile control unit FCU via a parallel bus Pb. The facsimile transmitting function performs data conversion in the facsimile control unit for a public line communication network (communication network) PN, and transmits it to the communication network PN. A facsimile reception converts line data transmitted from the communication PN in the facsimile unit into image data, and transfers it to the image processing section 40 via the parallel bus Pb and access control section IMAC. A special image processing may not be performed in this case. Specifically, dot rearrangement and pulse control are performed in the video control section and a visual image is formed on a transfer sheet in the writing unit 5.

When plural jobs, such as a copy function, a facsimile communication function, a printing function, are to be performed simultaneously, usage rights using the reading unit 24, writing unit 5 and parallel bus Pb are controlled to be allocated by the system controller 26 and process controller 1.

The process controller 1 controls streaming of image data. The system controller 6 controls the entire system. These controllers control respective resources to start, and each includes a RAM 2 and ROM 3. Selection of functions of the digital multi functional copier is performed by selecting and inputting through an operation board (OPB), thereby setting a processing detail such as a copying function, a facsimile function, etc. A printer engine 4 illustrated in FIG. 3 includes an image forming mechanism of FIG. 2. Specifically, an electric instrument, such as a motor, a solenoid, a charger, a heater, a lamp, etc., an electric sensor, a mechanism driving electric system including an electric circuit (driver) for driving the electric instrument and sensor, a detection circuit (signal processing circuit), etc., are built in an image forming mechanism. The process controller 1 controls these electric circuits to operate, and reads detection signals (of operational conditions) of electric sensors.

For the respective PC drums 6*a*, 6*b*, 6*c* and 6*d*, latent image carrying units each including a charging roller, a PC drum, a cleaning mechanism, and a charge removing lamp are arranged around the PC drums. In the exemplary embodiment, these respective four latent image carrying units 4 and developing units 7*a* to 7*d* are detachable to the apparatus body as units.

Now, the latent image carrying unit 60*a* including the PC drum 6*a* and developing unit 7*a* is described with reference to FIG. 4A as one example. The remaining three latent image carrying units and developing units are the same in a configuration with each other. Front side end section 61 of a shaft of the PC drum 6*a* of the latent image carrying unit 60*a* penetrates and extrudes from the front cover 67 (in FIG. 4B) of the unit 60*a*. The front side end section 61 is formed in a cone shape so as to sharply protrude in order to readily enter into a positioning hole for PC drum 6*a* use (not shown) formed on a surface plate 81 (in FIG. 4B) of the surface unit 80 for shaft aligning use.

On the surface plate 81, plural positioning holes are formed so as to receive a shaft 61 of the PC drum 6*a* and a developing roller shaft 71 of the developing unit 7*a*. Thus, positioning of the shaft of the PC drum 6*a* and the developing roller shaft of the developing unit 7*a* are precisely performed in the front side end sections when the surface plate 81 is secured to a base frame. There is provided a large diameter hole on the surface plate 81, into which normal close micro switches 69*a* and 79*a*, each being capable of detecting a latent image carrying unit 60*a* and a developing unit 7*a* (see FIG. 6) are fit. These micro switches are supported by the print substrate 82. An inner surface of the surface plate 81 is covered by an inner cover 84. An outer surface of the print substrate side is also covered by an outer cover 84.

In the carrying unit 60*a*, a screw pin 64 for micro switch 69*a* operation use is provided while protruding from the unit front surface. A similar screw pin 74 is also provided in the developing unit 7*a*.

Figure 4A:
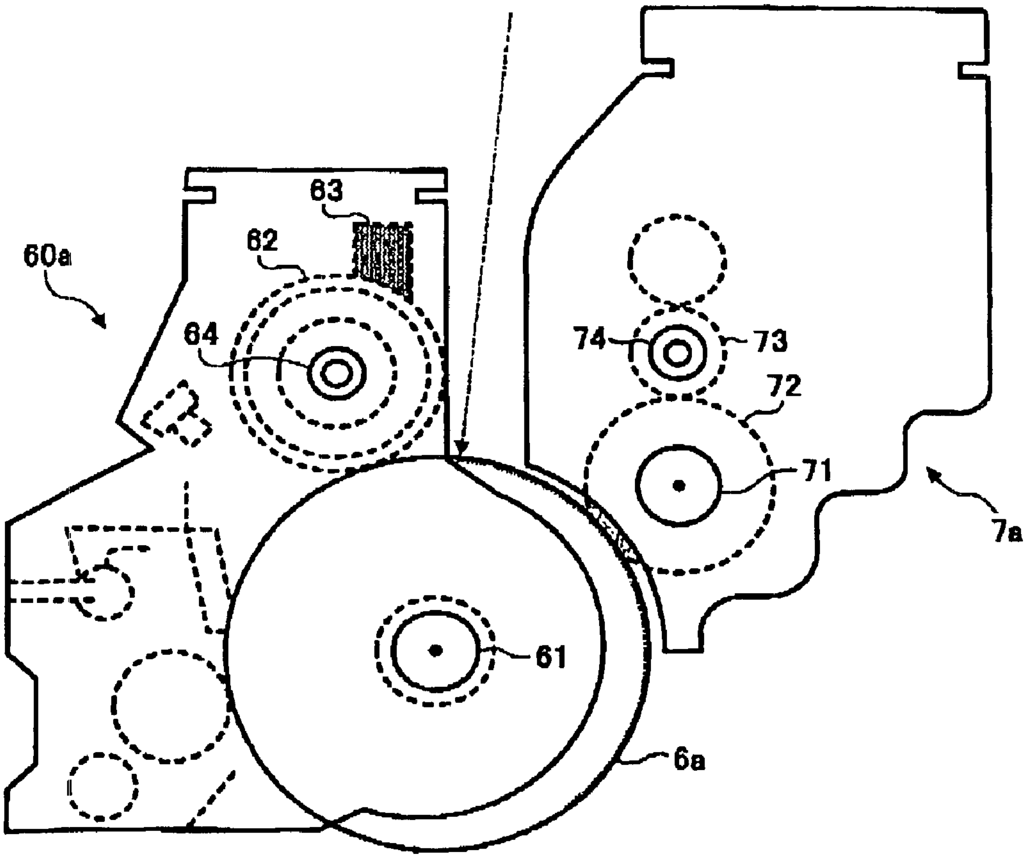
FIG. 4A is a front view of latent image forming and developing units.

As illustrated in FIG. 4A, the charging roller 64 that uniformly charges the PC drum 6*a* contacts the PC drum 6*a*, and rotates at substantially the same peripheral speed with the PC drum 6*a*. Stain of the surface of the charging roller 64 is wiped out by a cleaning pad 63. The rotary shaft 62*a* of the charging roller 64 is freely rotatably supported by the front side supporting plate 68 of the latent image carrying unit 60*a* via a bearing. A connection sleeve 65 is secured at a tip of the rotary shaft 62*a*, and integrally rotates with the rotary shaft 62*a*. There is provided a hole having a square section at a center of the connection sleeve 65. An almost square pillar shape foot 64*b* of the screw pin 64 fits into the hole. About two third length of the male screw side of the foot 64*b* is assigned to the square pillar so as to engage with the square hole of the connecting sleeve 65. The remaining almost one-third length of the leading end side of the foot 64*b* is formed in a round bar state so as to perform idling rotation with the connecting sleeve 65.

Figure 4B:
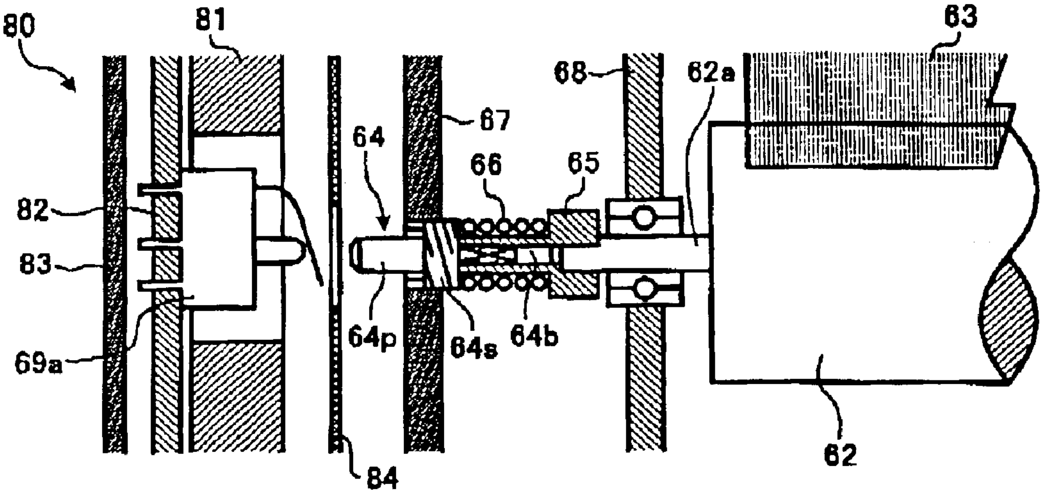
FIG. 4B is a longitudinal cross sectional view illustrating a vicinity of a screw attached to the latent image forming unit illustrated in FIG. 4A.
Figure 4C:
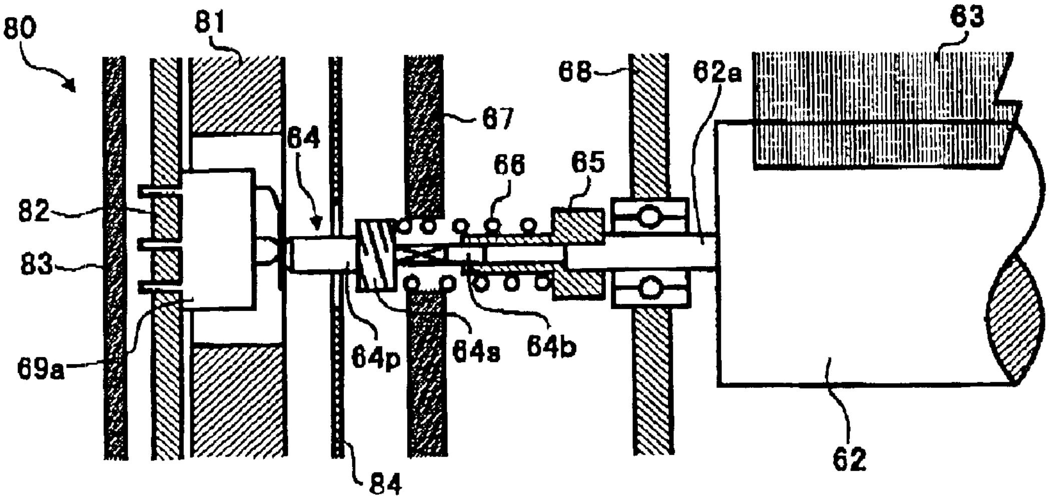
FIG. 4C is a longitudinal cross sectional view illustrating a charging roller attached and rotationally driven.

As illustrated in FIG. 4B, a large diameter male screw 64*s* is provided between the tip pin 64*p* and foot 64*b* of the screw pin 64 so as to engage with a female screw hole formed on the unit front surface cover 67 in a new (i.e., virgin) latent image carrying unit 60*a*, and compresses a return spring 66. In this condition, a protruding length of the pin from the unit front surface is lessened. However, when the charge roller 62 is rotationally driven, the screw pin 64 rotates, and moves so as to approach the surface plate 81 in order to connect with the female screw hole. As a result, the screw pin 64 contacts a switching operation element of the micro switch. Owing to this movement, the normally closed micro switch is turned from close to open positions immediately before the male screw 64*s* of the screw pin 64 has penetrated the female screw hole.

As illustrated in FIG. 4B, when the male screw 64*s* has penetrated the female screw hole, the pin 64 is protruded by the return spring 66. Thus, the square pillar section of the foot 64*b* of the pin 64 exits from the square hole of the sleeve 65, thereby, the pin 64 never rotates even if the charging roller 62 rotates.

Thus, when the latent image carrying unit (e.g. 60*a*) is continuously attached to the copier, the micro switch 69*a* is always open (OFF). When a new (virgin) latent image carrying unit 60*a* is attached, namely, the unit is replaced, the micro switch 69*a* keeps the closed position (ON) until the charging roller 62 is rotationally driven. It can be realized that power is firstly supplied after the unit is replaced if the micro switch 69*a* is closed when the copier is supplied with the power and is then open when an image forming unit is started driving. Specifically, a unit is replaced immediately before the power is supplied. Attachment and replacement of the other latent image carrying units and developing units are similarly detected. Further, in each of the developing units 7*a* to 7*d*, a screw pin 74 similar to that 64 is connected to a smoothing roller 73 synchronously rotating in the same direction with the developing roller 72 via a supporting mechanism similar to that of the front surface cover section of the transfer roller 62.

A test pattern formed on the transfer belt is now described with reference to FIG. 5. As shown, the test pattern is formed on the transfer belt 10 of the color printer when color matching is performed. Specifically, in a rear side thereof, a start mark Msr (e.g. black) is formed and eight mark sets are formed there after one after another after an interval of four marks 4d. The eight mark sets extend over one circle length of the transfer belt 10 in a constant cycle of (7d+A+c). Of course, those skilled in the art will recognize that the invention is not limited to the specific mark configuration discussed above.

The mark set cycle may amount to three fourth of one circle length of the respective PC drums 6*a* to 6*d* each having the same diameter. Thus, eight mark sets and one start mark, totally 65 marks, are formed around the one peripheral length of the transfer belt 10.

A first mark set includes orthogonal mark bands formed from a first orthogonal mark Akr for black Bk, a second orthogonal mark Ayr for yellow Y, a third orthogonal mark Acr for cyan C, and a fourth orthogonal mark Amr for magenta M in the main scanning direction X (i.e., width wise direction of the transfer belt 10). In the exemplary embodiment, the first mark set also includes oblique mark bands each forming a 45 degree angle with the main scanning direction X. Each of the oblique mark bands is formed from a first oblique mark Bkr for black Bk, a second oblique mark Byr for yellow Y, a third oblique mark Bcr for cyan C, and a fourth oblique mark Bmr for magenta M. Second to eighth mark sets are similarly formed to the first mark set. Also, substantially the same test patterns to those formed in the rear side are simultaneously formed in the front side. Legends "r" suffixed to respective marks included in these test patterns represent rear side items. Legends "f" suffixed to respective marks included in these test patterns represent front side items.

Figure 16A:
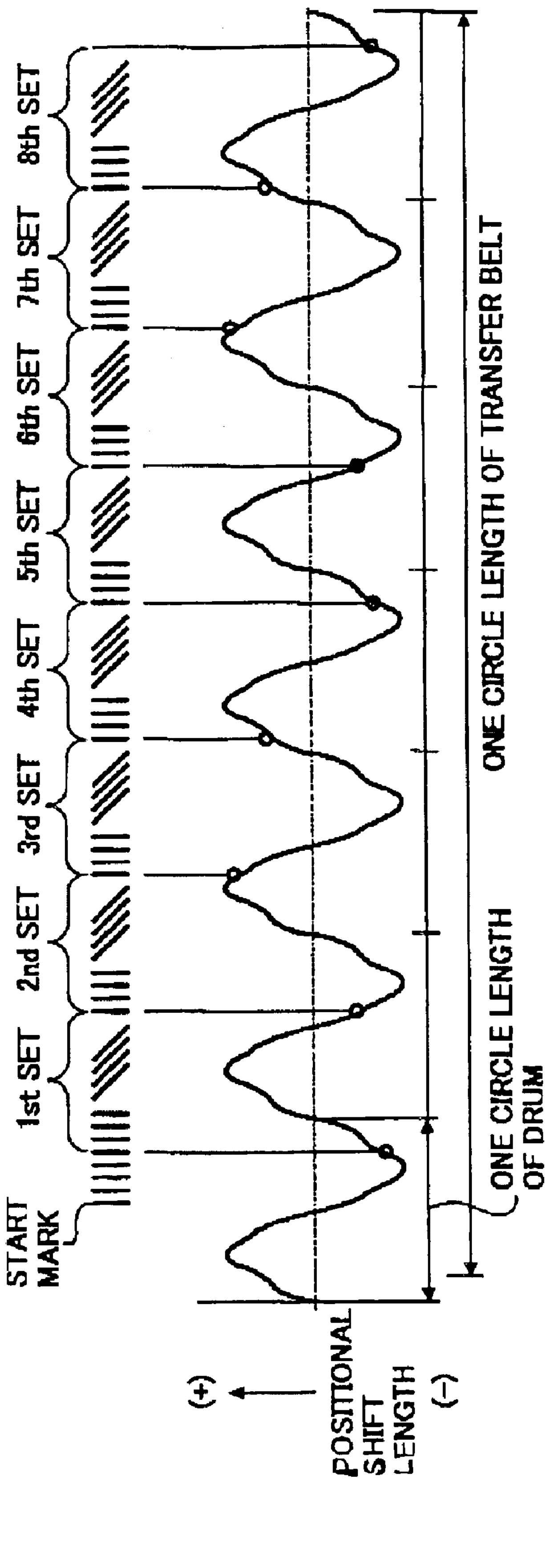
FIG. 16A is a graph illustrating a distribution of test patterns formed over one circle length of the transfer belt 10 together with displacements of mark formed positions corresponding to a rotational angle of a photosensitive drum; further.
Figure 16B:
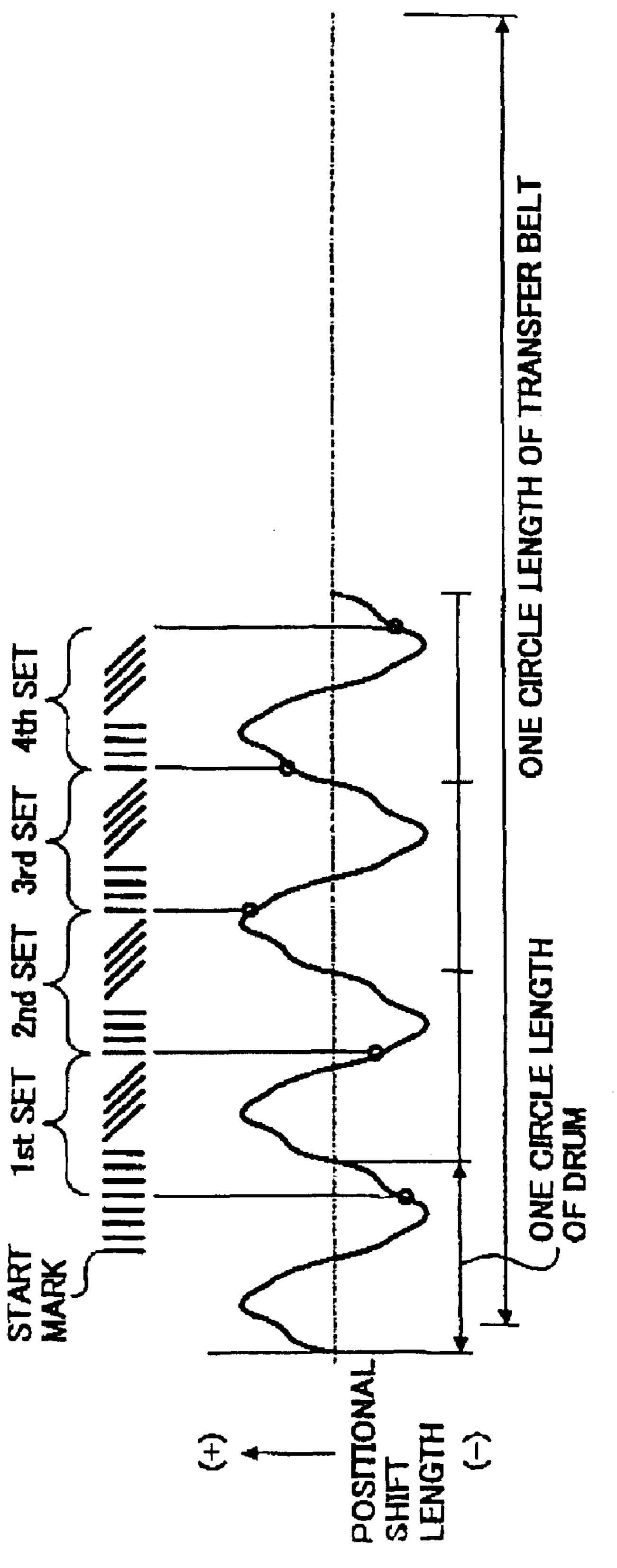
FIG. 16B is a graph illustrating a distribution of test patterns formed over one circle length of the transfer belt 10 together with displacements of mark formed positions corresponding to a rotational angle of a photosensitive drum.

As shown in FIG. 16A, displacements of mark formation positions from reference positions, which displacements are caused by eccentricity of the peripheral surface of the PC drum, one circle length of the transfer belt 10, and sets of marks transferred from the PC drums to the transfer belt are expanded and illustrated on a straight line. One circle length of the transfer belt maybe seven times of that of the PC drum 10. Thus, eight mark sets are transferred from PC drum bands 6*a* to 6*d* during six cycles of the PC drum. Since the start mark is formed before the mark sets, totally 65 marks including the start mark and those in the mark sets are formed while extending over the seven cycles of the PC drum. Since the mark sets are formed in a cycle equivalent to three fourth of the one circuit length of the PC drum, first to fourth sets are formed at respective positions on the peripheral surface of the PC drum. Fifth to eighth mark sets are formed substantially on the same positions to those of first to fourth mark sets.

Figure 6:
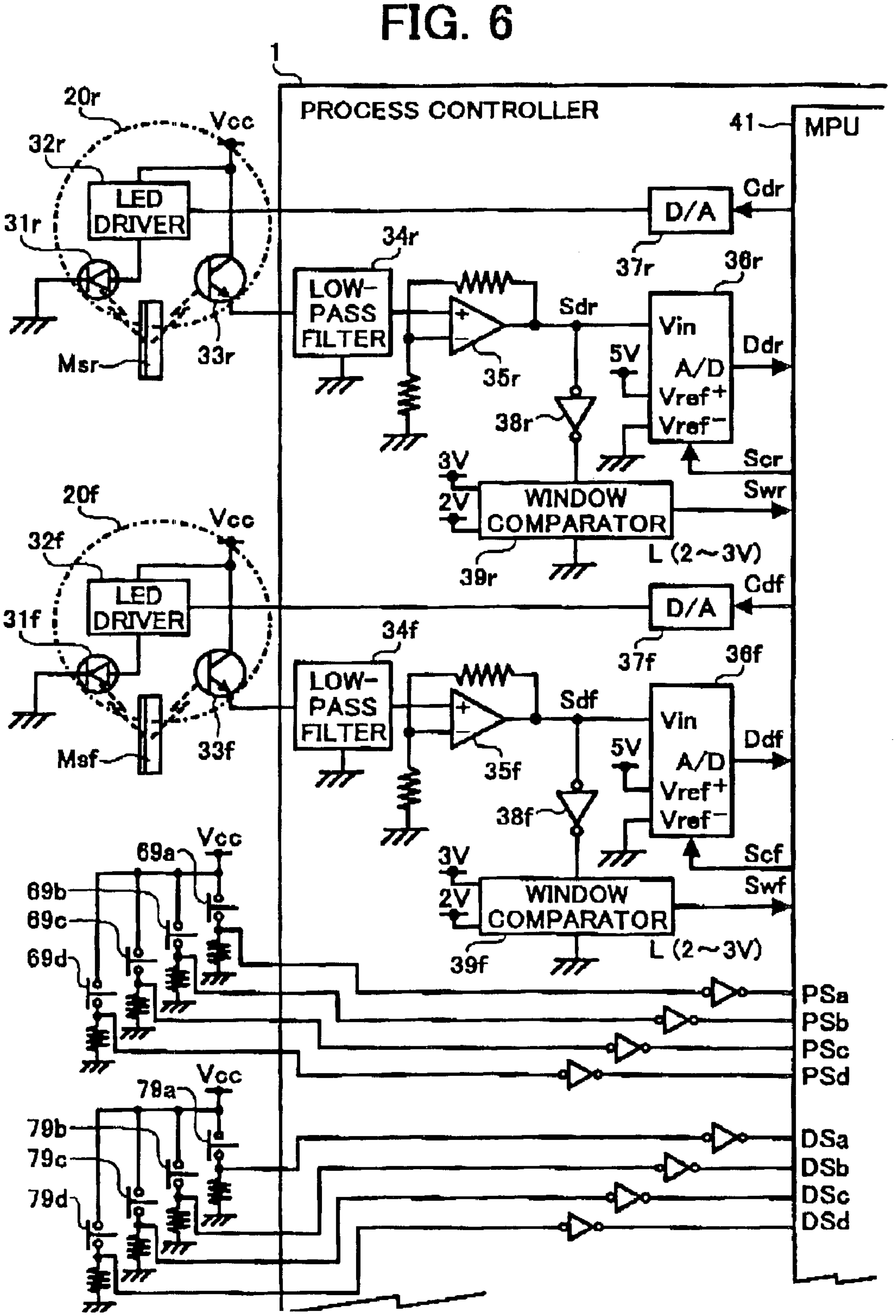
FIG. 6 is a block diagram partially illustrating a process controller 1 illustrated in FIG. 3.

FIG. 6 illustrates the above-mentioned micro switches 69*a* to 69*d* and 79*a* to 79*d* for unit attachment detection use, optical sensors 20*r* and 20*f*, and an electric circuit that reads detection signals therefrom of the exemplary embodiment. At the stage of mark detection, a CPU of the micro computer (MPU) 41 mainly including a ROM, RAM, and data storage use FIFO or the like gives conducting data to the D/A converters 37*r* and 37*f* so as to designate conducting current amounts of the optical sensors 20*r* and 20*f* and LEDs 31*r* and 31*f*. The D/A converters 37*r* and 37*f* convert to analogous voltage and supplies to the LED drivers 32*r* and 32*f*. These drivers 32*r* and 32*f* turn the LEDs 31*r* and 31*f* ON so as to flow current having an amount in proportion to the analogous voltage.

Respective light generated by the LEDs "r" and "f" pass through slits (not shown) and reach the transfer belt 10. Almost all of light permeates it and is reflected by a rear side light reflector 21 that sliding contacts the rear surface and suppresses vertical vibration of the transfer belt 10. The light then permeates the transfer belt 10 and reaches the phototransistors 33*r* and 33*f* via the slit. Thus, impedance between respective collector and emitter of the transistors 33*r* and 33*f* are low, and thereby emitter voltage increases. Since the above-mentioned marks Msr or the like block the light to arrive at the LEDs 31*r* and 31*f*, impedance between respective collector and emitter of the transistors 33*r* and 33*f* are high, and thereby emitter voltages (i.e., a level of each of detection signals) decrease. Thus, when test patterns are formed on the moving transfer belt 10 as mentioned above, detection signals of the optical sensors 20*r* and 20*f* vary up and down in voltage. Thus, the high voltage represents absence of a mark, and the low voltage existence of the mark, respectively.

Figure 13:
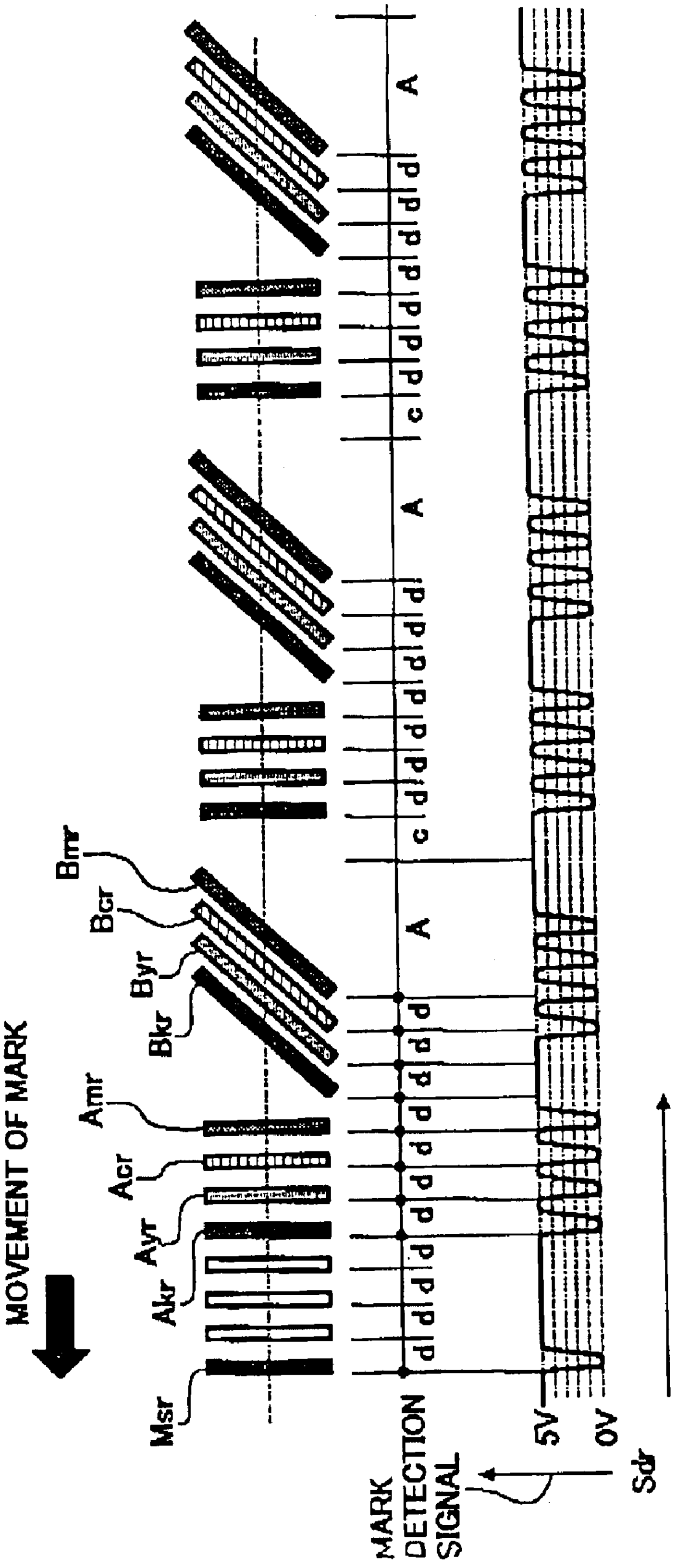
FIG. 13 is a plan view illustrating a distribution of color marks formed on a transfer belt relative to a timing diagram illustrating a change in a level of a detection signal of an optical sensor, which is obtained by reading a color mark.

Detection signals of the optical sensors 20*r* and 20*f* pass through the low pass filters 34*r* and 34*f* of high frequency noise removing use, and levels of those are then calibrated by the amplifiers 35*r* and 35*f* of level correction use within zero to five volt. The detection signals are then applied to the A/D converters 36*r* and 36*f*. One example of calibrated detection signals "Sdr" is illustrated in FIG. 13. Specifically, the upper side of FIG. 13 represents a distribution of color marks formed on the transfer belt 10. The lower side thereof represents a detected level variation of a detection signal Sdr obtained by detecting the color marks.

Referring back to FIG. 6, the above-described detection signals Sdr and Sdf are given to the A/D converters 36*r* and 36*f* and window comparators 39*r* and 39*f* via the amplifiers 39*r* and 38*f*.

In the exemplary embodiment, the A/D comparators 36*r* and 36*f* each includes a sample hold circuit at its input side and a data latch (output latch) circuit at its output side. The A/D comparators 36*r* and 36*f* hold voltage of detection signals generated when the MPU 41 gives A/D conversion designation signals Scr and Scf, and convert those to digital data so as to hold in data latches. Accordingly, the MPU 41 can read detection signals Ddr and Ddf of digital data representing levels of detection signals Sdr and Sdf by giving the designation signals Scr and Scf when the detection signals Sdr and Sdf is required to be read.

The window comparators 39*r* and 39*f* generate level determination signals Swr and Swf such as low levels "L" when the detection signals Sdr and Sdf range from two to three volts, high levels "H" when deviating the range, etc. The MPU 41 can immediately recognize if the detection signals Sdr and Sdf range within the same by referring to these level determination signals Swr and Swf.

Figure 7A:
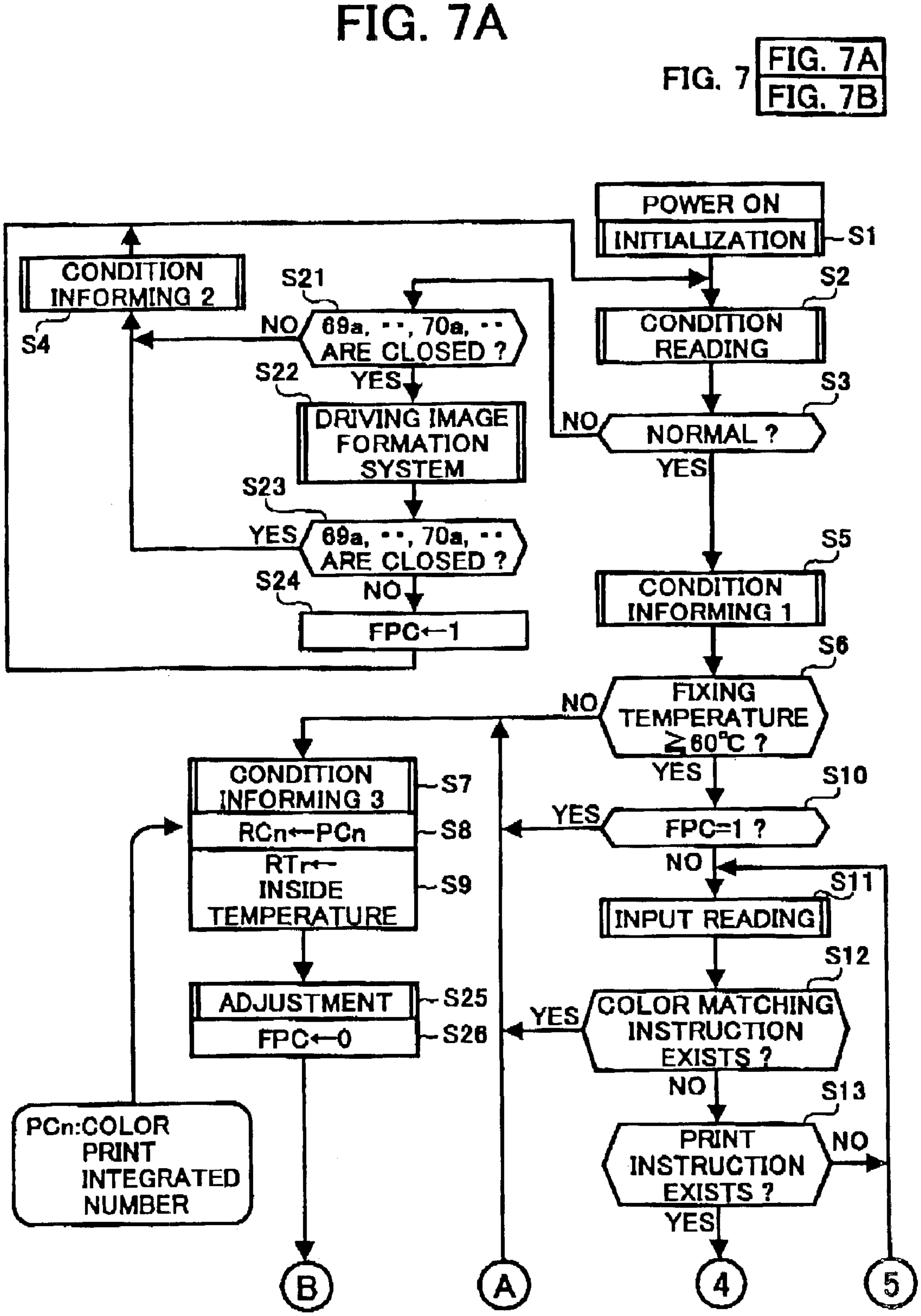
FIGS. 7A and 7B are a schematic flowchart illustrating a printing control operation performed by an MPU illustrated in FIG. 6.
Figure 7B:
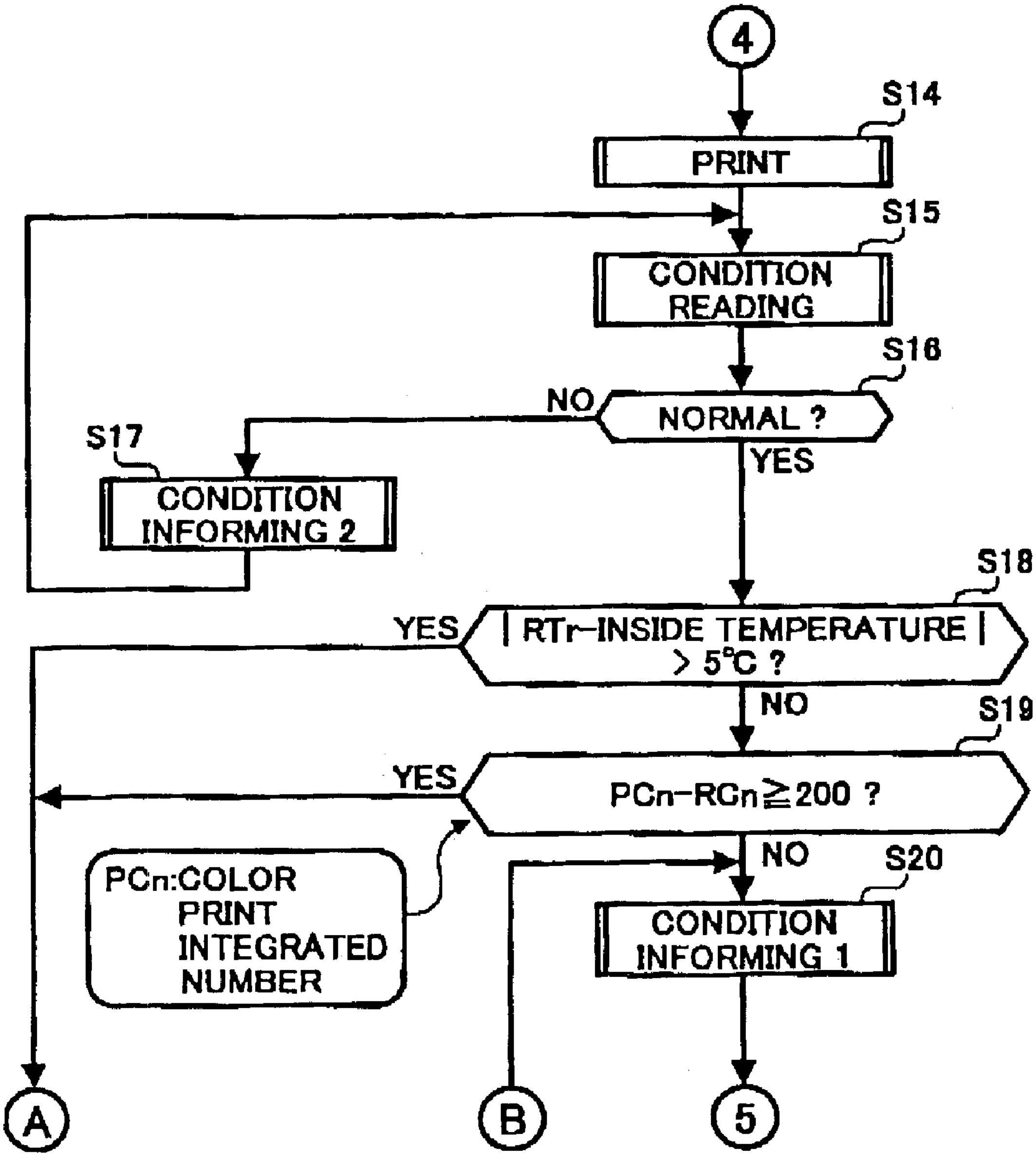

A printer engine control operation of the exemplary embodiment, performed by the MPU 41, is now described with reference to FIG. 7A. When receiving impression of operational voltage, the MPU 41 sets a signal level of an input/output port, an interior register, and a timer and similar to be idling conditions thereby initializing those instruments (in step S1).

After that, the MPU 41 reads conditions of respective mechanisms and electric circuit (in step m2) so as to check if abnormality working against image formation exists (in step S3) When the checking result indicates the abnormality, it is then check if any one of micro switches 69*a* to 69*d* and 79*a* to 79*d* is a closed position (i.e., ON) (in step S21). Determination that any one of the micro switches is the closed position represents that a latent image forming or developing unit is not attached to the position of the micro switch of the closed position. It also represents that a power supply of a color copier is turned ON immediately after a unit is replaced with a new unit. Then, in order to identify either one of them, the MPU temporary drives an image forming system (in steps S21 and S22). Then, the transfer belt 10 is driven in a transfer sheet conveyance direction. Simultaneously, the PC drums 6*a* to 6*d*, charging rollers 62 contacting the PC drums, and developing rollers 72 of the developing units 7*a* to 7*d* are rotated. If it is immediately after when the old unit is replaced with the new, the micro switch of the closed position is switched to the open position (i.e., attachment is detected) as mentioned earlier. If none of unit is attached, the micro switch remains the closed position.

When the micro switch of the closed position is switched to the open position as a result of driving the image forming system, specifically, when the micro switch detecting attachment of the Bk latent image forming unit, for example, is switched from the closed (Psd=L) to open positions (Psd=H), the MPU 41 clears a print accumulation number register assigned to a region in a non-volatile memory for the Bk latent image forming unit (i.e., initializing the Bk print accumulated number to be zero), and writes "1" representing execution of replacement of the unit in the register FPC (in step S24).

Further, when the micro switch is not switched to the open position, the MPU 41 regards that the unit is not attached and alarms. Further, when the other abnormality occurs in step 21, it is displayed on the operation display board (OPB) (in step m4). Conditions are repeatedly read until the abnormality disappears. If there is no abnormality, the power is started to be supplied to the fixing device. Then, it is checked if temperature is sufficient to perform fixing. If it is insufficient, awaiting mark is displayed. If it is sufficient, a print available mark is displayed (in step S5).

Further, it is checked if the fixing temperature exceeds 60 degree (instep S6), less than which a color matching operation is necessitated. Specifically, if the fixing temperature is less than 60 degree, it is regarded that power supply to a copier is turn ON after long time halt (no use), for example, regarding that power is supplied to a copier as a first thing in the morning and a change in a machine environment during the halt is large, a color-matching execution indication is displayed on the operation display board (instep S7). A color print accumulated number "Pcn" stored at that time in the non-volatile memory is written in a register assigned to a region of a memory of the MPU 41 (in step S8). A machine interior temperature at that time is also written in a register "Rtr" of the MPU 41 (in step S9), and later mentioned adjustment (color matching) is performed (in step S25). After that, the register "FPC" is cleared (in step m26). Details of the adjustment executed in step S25 are described later in detail with reference to FIG. 8A.

If the fixing temperature exceeds 60 degree, it is regarded that a short time has elapsed after the power supply to the copier is lastly turned OFF. Specifically, it can be supposed that a machine interior temperature slightly changes from when the power supply is turned OFF last time. It is then checked if any one of color latent image forming units 60*a* to 60*d* or that of developing units 7*a* to 7*d* is replaced. In other words, it is checked if information indicating unit replacement is generated in the above-mentioned step S24 (step of S10), because it generally needs color matching in such a situation. If the information exists, specifically, a unit is replaced, steps S7 to S9 are executed, and the below described adjustment is performed (in step S25).

The MPU 41 can await an input of an operator through the operational display board and a command from a PC when the image-forming unit is not replaced (in step S11). In this situation, if an instruction of color matching is given by the operator through the operation display board (in step S12), the MPU 41 executes steps S7 to S9, and the below described adjustment (in step m25) is executed.

When the fixing temperature is fixing available level, and respective sections are ready to start, and a copy start instruction is given through the operation display board, otherwise, a print start instruction is given from the PC in correspondence with a printing command from the system controller 26 (in step S13), the MPU 41 forms a designated number of images (in step S14). In this image formation, every time when image formation and ejection is performed, the MPU 41 gives an increment of one to respective data of the print total number register, color print accumulation number register PCn, and Bk, Y, C and M print accumulation number registers assigned to portions of the non-volatile memory when a color printing has been completed. When a monochrome printing has been performed, the MPU 41 gives an increment of one to respective data of the print total number register, monochrome print accumulation number register, and Bk print accumulation number register.

Further, data of the Bk, Y, C and M print accumulation number registers are initialized to be zero when the Bk, Y, C and M latent image forming units are replaced with the new.

The MPU checks abnormality such as paper trouble every time when one image formation is completed. The MPU reads conditions such as developing density, fixing temperature, machine interior temperature, etc., when a prescribed designated number of printings are terminated (in step S15). Then, the MPU 41 checks if there exists abnormality (in step S16). If the abnormality exists, its effect is displayed on the operation display board (in step S17), and reading conditions in step S15 is repeated until the abnormality disappears.

When the condition is normal enabling the image formation to restart, the MPU 41 checks if there exists a change exceeding a temperature range such as five degrees in the machine interior temperature after the last color matching operation (temperature is represented by data Rtr of the register Rtrs) (in step S17), because when the temperature changes more than the range, the below described color matching is generally necessitated. If there exists such a change, the MPU 41 executes the above-described steps S7 to S9, and the below described color matching operation (CPA). If there exists such a change, the MPU 41 then checks if a accumulated number stored in the color print accumulation number register PCn exceeds that of "RCn" accumulated by the last color matching operation by a range such as two hundred sheets (in step S19), because when the accumulated number exceeds more than the range of two hundred sheets, the below described color matching is generally necessitated. If it exceeds by two hundred sheets, steps S7 to S9 and the below described color matching operation (CPA) are executed. In contrast, if it does not exceeds by the range of two hundred sheets, the MPU 41 then checks if the fixing temperature is fixing available level. If it is not the fixing available level, the MPU 41 displays awaiting mark. In contrast, if it is the fixing available level, the MPU 41 displays a printing available mark (in step S20). Then, the process goes to step S11 so as to read an input.

Thus, as mentioned above with reference to FIG. 7A, the MPU 41 executes adjustment in step S25 any one of when power supply is turned ON while the fixing temperature is less than 60 degree, when any one of Bk, Y, C and M image forming units is replaced with a new, when an instruction of color matching is given from the operation display board, when a designated number of printings is completed and a machine interior changes its temperature by more than five degree after the last color matching operation is performed, and when a designated number of printings is completed and a color print accumulation number PCn increases more than two hundred from the amount RCn accumulated by the last color matching operation.

Figure 8A:
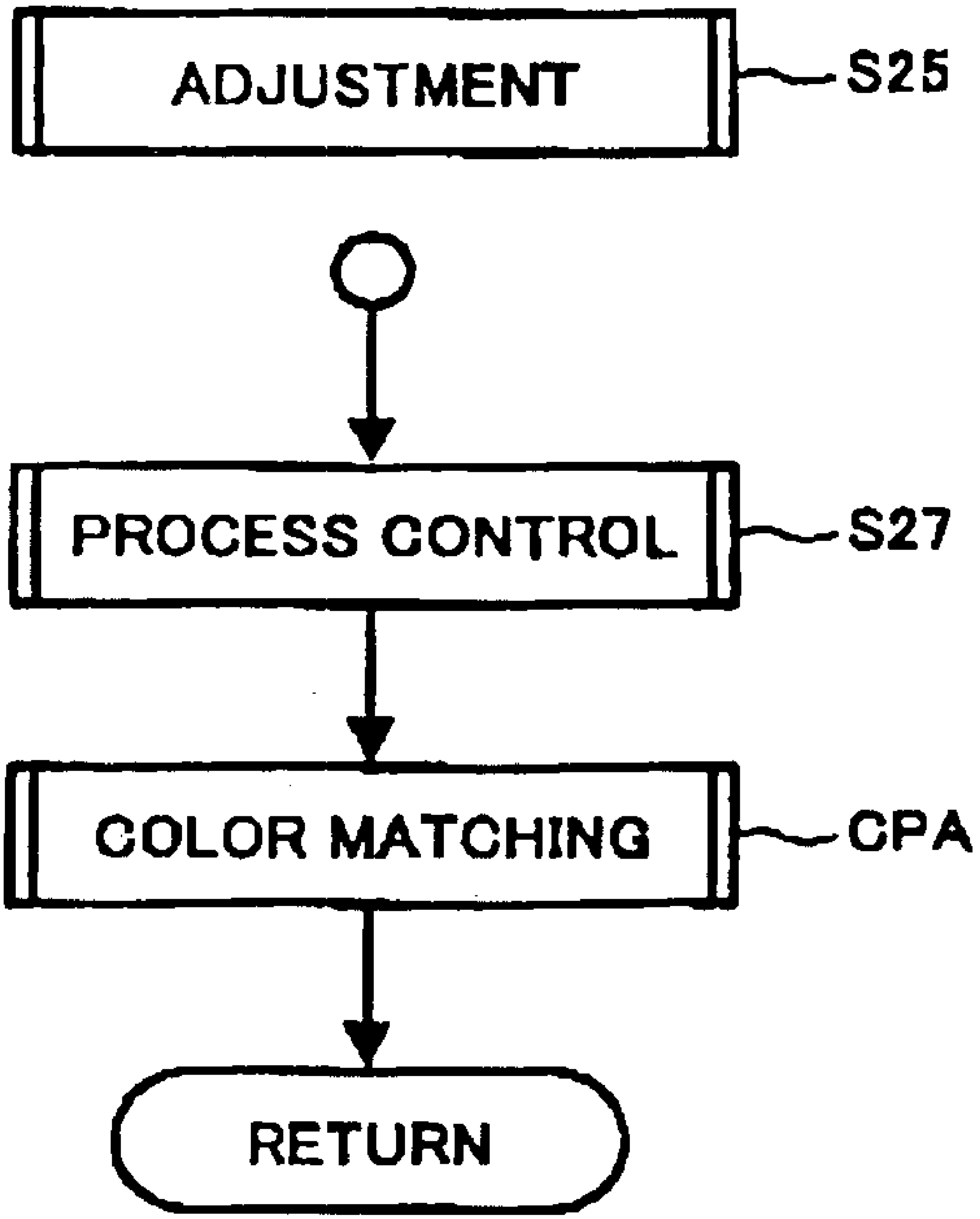
FIG. 8A is a flowchart illustrating the operation of a process controller.
Figure 8B:
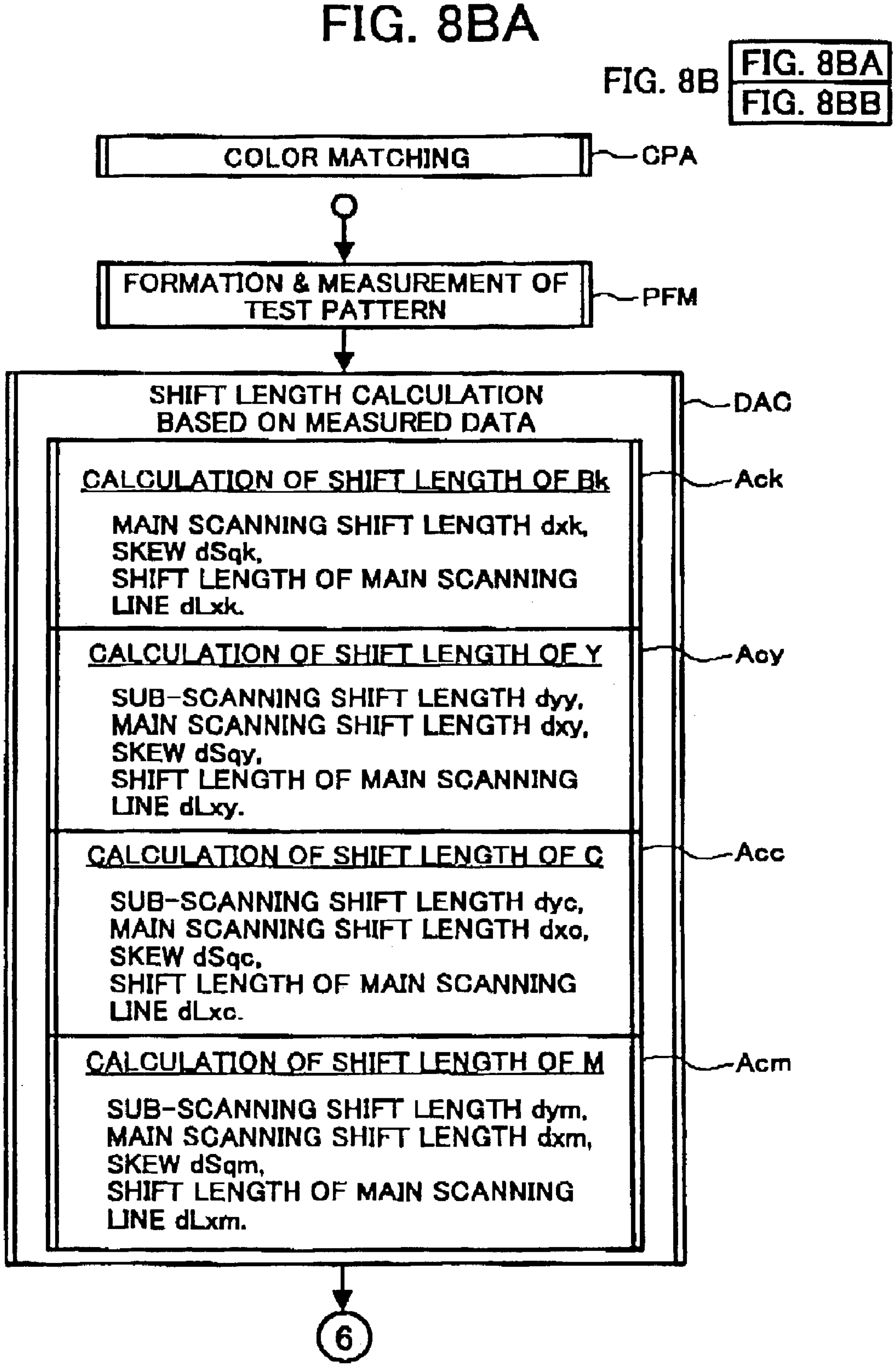
FIG. 8BA is a flowchart illustrating an adjusting operation.
Figure 8B:
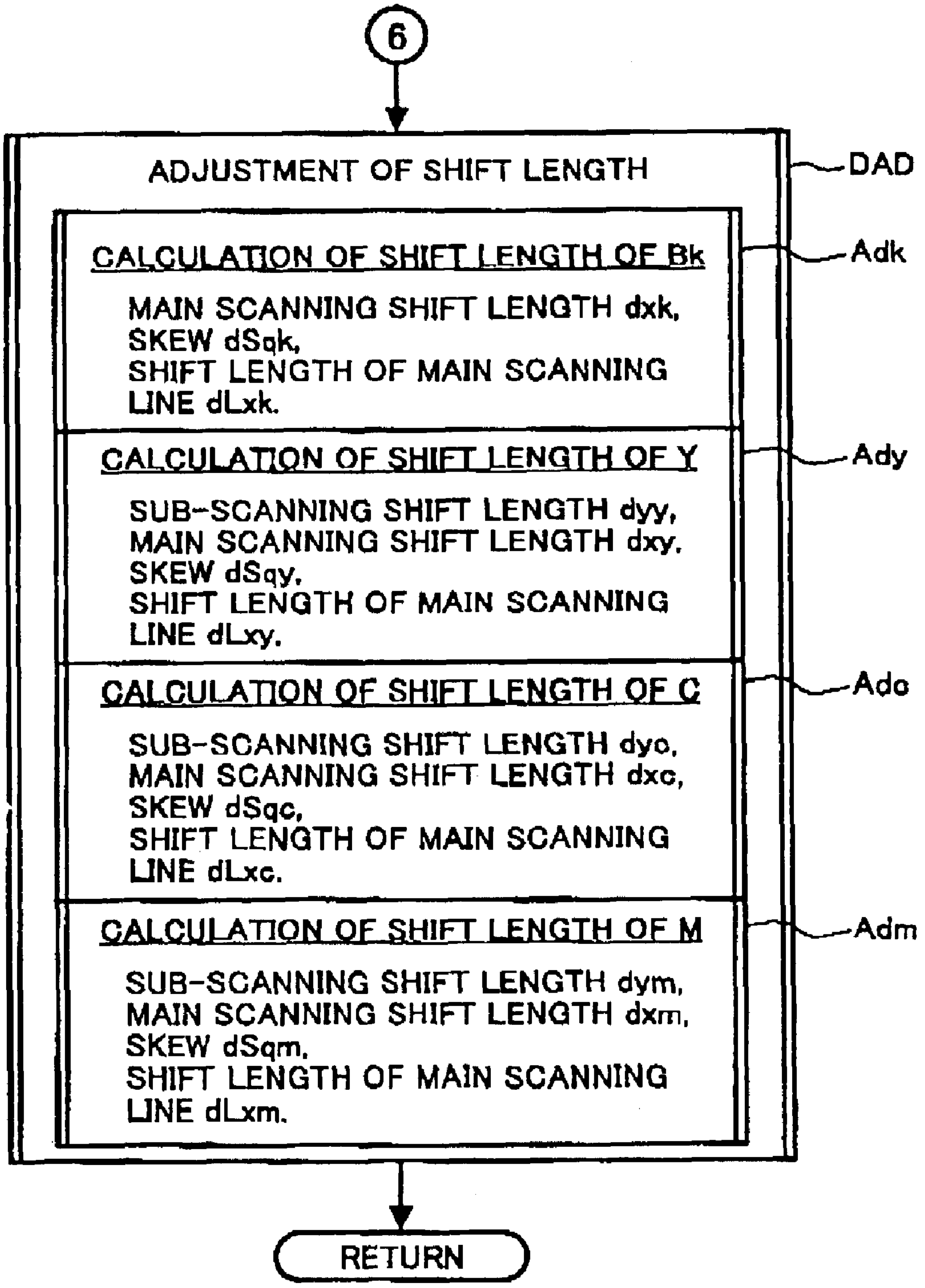

Details of the adjustment are described with reference to FIG. 8BA. As shown in FIG. 8A, respective image forming conditions for charging, exposing, developing, and transferring and similar are set to be reference levels by the process controller. Respective Bk, Y, C and M images are formed both on the rear and front sides on the transfer belt 10, and those image densities are detected by the optical sensors 20*r* and 20*f* to be controlled. Impression voltage for the charging roller, exposure intensity, and developing bias are adjusted so as to cause the respective images to be the reference level of the image density. Then, color matching is executed.

Details of color matching are now described with reference to FIG. 8BB. When the process advances to a color-matching step, the MPU 41 initially forms and measures test patterns, in particular, forms start marks Msr and Msf and eight sets of test patterns both on the rear and front sides "r" and "f" on the transfer belt 10 as illustrated in FIG. 5 in accordance with image formation conditions (parameters) set by the process control executed in step S27. The respective marks are detected by the optical sensors 20*r* and 20*f*. Mark detection signals Sdr and Sdf are thus obtained and are converted into digital mark detection data Ddr and Ddf by the A/D converters 36*r* and 36*f* into digital mark detection data Ddr and Ddf. The MPU 41 then reads those digital mark detection data. Then, the MPU 41 calculates positions (i.e., distribution) of the respective centers of the marks formed on the transfer belt 10. Further, in the exemplary embodiment, both of average positions of the rear and front side eight sets (i.e., an average band of the mark positions) are calculated. Formation and measurement of such test patterns are described in detail with reference to FIG. 9 and subsequent drawings.

When the average positions are calculated, respective displacements of image formation of Bk, Y, C and M image forming units are calculated (DAC) in accordance with the average positions. Adjustment (DAD) is then performed so as to suppress (sometimes eliminates) the calculated displacements in accordance with the calculated displacements.

Figure 9:
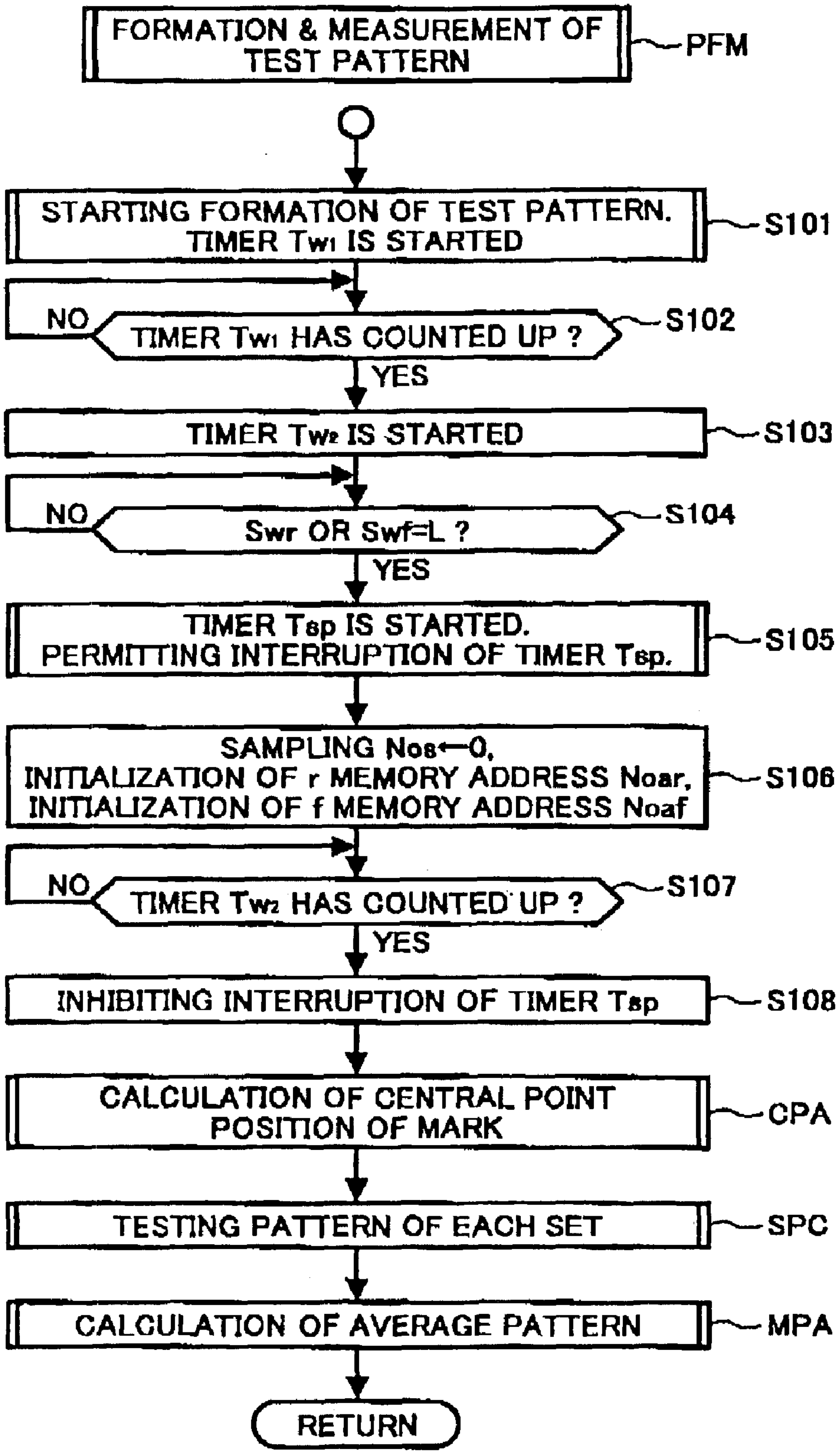
FIG. 9 is a flowchart illustrating formation and measurement of color mark test patterns.

The test patterns (color marks) formation and measurement performed by the above-described PFM is now described with reference to FIG. 9. When the process advances to the PFM, the MPU 41 starts simultaneously forming respective start marks Msr and Msf, and eighth sets of test patterns each including different color marks each having a width of 1 mm in the "y" direction, a length of 20 mm in the X direction. In the exemplary embodiment, as illustrated in FIG. 5, respective marks are distanced from each other by a thickness "d" of 6 mm. The sets of test patterns are formed at an interval "c" of 9 mm both on the rear "r" and front "f" sides of the transfer belt 10 that is driven at a constant speed of 125 mm/sec, for example. The timer Tw1 having a time limit "Tw1" is started so as to time until when the start marks Msr and Msf just arrive at positions right under the optical sensors 20*r* and 20*f*. Thus, the MPU 41 awaits time out of the timer Tw1. When the timer Tw1 is timeout, the timer Tw2 having a time limit Tw2 is started so as to time until when the respective last test patterns of the eighth sets on both rear and front sides have passed the optical sensors 20*r* and 20*f*.

As mentioned above, when marks Bk, Y, C and M do not exist in fields of views of the optical sensors 20*r* and 20*f*, detection signals Sdr and Sdf of the optical sensors 20*r* and 20*f* are high levels. In contrast, those signals are low levels (e.g. zero volt) when the marks exist. Then, while the transfer belt moves at the constant speed, the detection signal Sdr varies in its level as illustrated in FIG. 13. Such a variance is enlarged and illustrated in FIG. 14A. The declining region showing declining of a level of a mark detection signal corresponds to a leading edge region of the mark. The declining portion showing rising of the level of the mark detection signal corresponds to a trailing edge region of the mark. An interval between the declining and rising regions corresponds to a mark width "W".

As the start marks Msr and Msf arrive at the fields of views of the optical sensors 20*r* and 20*f*, the detection signals Sdr and Sdf change from High to Low level, and the window comparators 39*r* and 39*f* of FIG. 6 await conditions that the detection signals Sdr and Sdf indicate levels of Swr=L and Swf=L indicating two to three volt. Specifically, the window comparators 39*r* and 39*f* monitors if edge regions of the start marks Msr and Msf arrive at the fields of the views of the optical sensors 20*r* and 20*f*.

When the detection signals Swr and Swf are logic lows, for example, the timer Tsp having a time limit Tsp corresponding to a sampling interval (e.g. 50 micro second due to a sampling frequency of 20 kilo Hz) is started. When the timer Tsp is time up, the below described timer interruption operation is permitted illustrated in FIG. 10. Then, a number of sampling (i.e.,reading a voltage) times "Nos" stored in the sampling times register "Nos" is initialized to prepared for measuring coming marks. Also, writing addresses Noar and Noaf included in the "r" and "f" memories allocated in portions of the FIFO memory of the MPU 41 (e.g. rear and front side mark reading data storing regions) are initialized to be start addresses, respectively. Then, time out of the timer Tw2 is awaited. Specifically, the entire eighth sets of the test patterns are awaited until those have passed the fields of the views of the optical sensors 20*r* and 20*f*.

Figure 10:
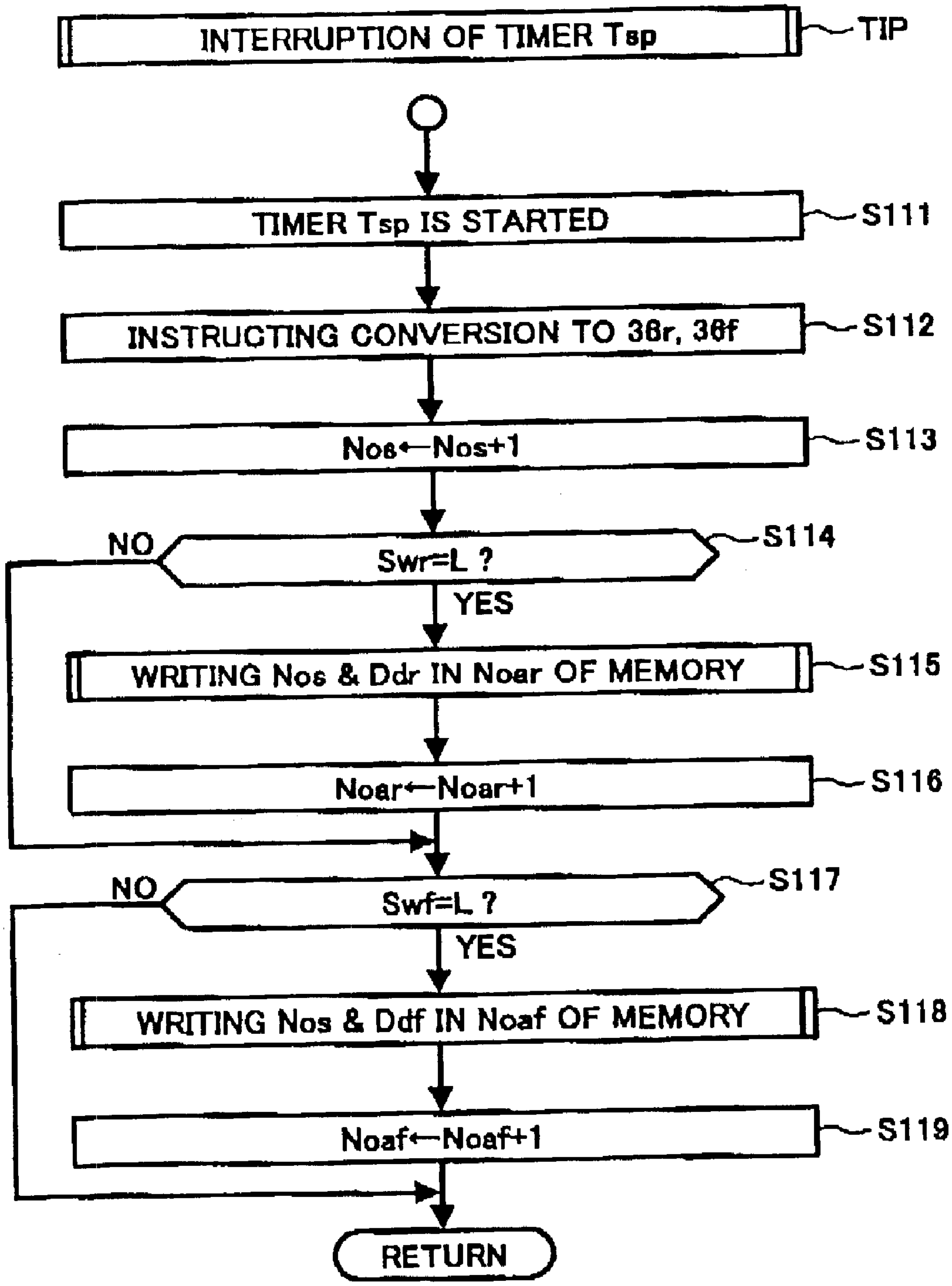
FIG. 10 is a flowchart illustrating an interruption operation performed during sampling intervals.

The interruption operation performed after the above-described timer Tsp is now explained with reference to FIG. 10. Attention should be paid to that the interruption process is performed every when the time limits tsp has timed by the timer Tsp. At the beginning of the process, the MPU 41 restarts the timer Tsp and instructs the A/D converters 36*r* and 36*f* to perform the A/D conversion. Specifically, the MPU 41 sets A/D conversion designation levels "L" as detection signals Scr and Scf, temporarily?. Then, the MPU 41 gives an increment of one to the number of sampling times "Nos" of designated number of times stored in the sampling times register Nos. Thus, the Nos·Tsp represents an elapsing time period starting from when the leading edge of the start mark Msr or Msf is detected. The elapsing time period corresponds to a position detected by the optical sensor 20*r* or 20*f*, which is distanced from the base point of the start mark Msr or Msf along the surface of the transfer belt 10 in the belt moving direction "y".

Then, whether or not the detection signal Swr of the window comparator 39*r* is logic low is checked. Specifically, if the optical sensor 20*r* is detecting the edge of the mark and the following equation is met:

$$2V \leqq Sdr\ r \leqq 3V$$

If so, both of the number of sampling times Nos stored in the sampling times register Nos and A/D conversion data Ddr (i.e., a value of mark detection signal Sdr by the optical sensor 20*r*) are written in the "r" memory address Noar as writing data. Then, the writing address Noar of the "r" memory is given the increment of one. When the detection signals Swr of the window comparators 39*r* and 39*f* indicate logic High (e. g. Sdr r<2V or 3V<Sdr), data writing in the "r" memory is not performed. That is to decrease an amount of data to be written in a memory and to simplify subsequent data processing. Subsequently, similarly, whether or not the detection signal Swf of the window comparator 39*f* is low is checked. Specifically, if the optical sensor 20*f* is detecting the edge of the mark and the following equation is met:

$$2V \leqq Sdf \leqq 3V$$

If so, both of the number of sampling times Nos stored in the sampling times register Nos and A/D conversion data Ddf (i.e., a value of mark detection signal Sdf by the optical sensor 20*f*) are written in the address Noaf of the "f" memory as writing data. Then, the writing address Noaf of the "f" memory is given the increment of one.

Figure 14A:
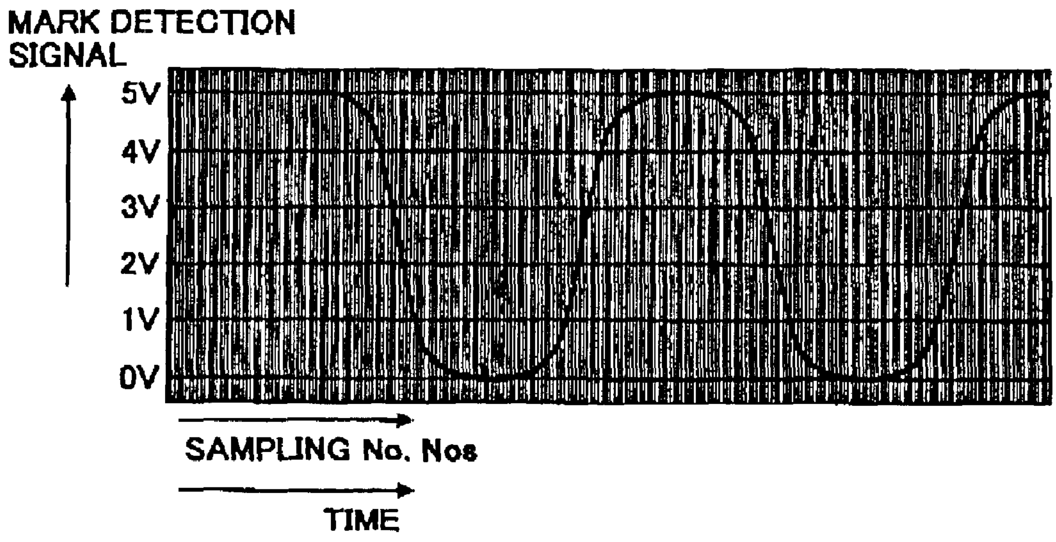
FIG. 14A is an enlarged timing diagram illustrating a portion of a detection signal "Sdr" illustrated in FIG. 13.
Figure 14B:
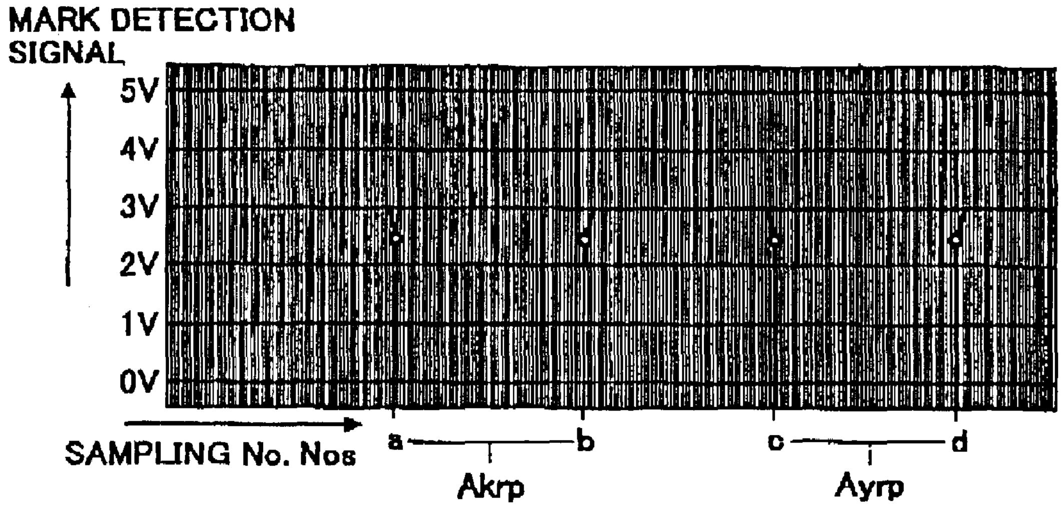
FIG. 14B is a timing diagram illustrating a range of A/D conversion data extracted and written in a FIFO memory included in an MPU 41 among detection signals illustrated in FIG. 14A.

Since such an interruption operation is repeated at a frequency of Tsp, when mark detection signals Sdr and Sdf of the optical sensors 20*r* and 20*f* vary up and down as illustrated in FIG. 14A, only the digital data Ddr and Ddf of the detection signals Sdr and Sdf ranging between two to three volt are stored in the respective "r" and "f" memories allocated in the FIFO memory of the MPU 41 together with the number of sampling times Nos as illustrated in FIG. 14B. Since the number of sampling times Nos of the sampling times register Nos is given the increment of one at the frequency of Tsp, and the transfer belt 10 moves at a constant speed, the number of times Nos represents a "y" position along the surface of the transfer belt 10 originated from the detected start mark as a base point.

Figure 11:
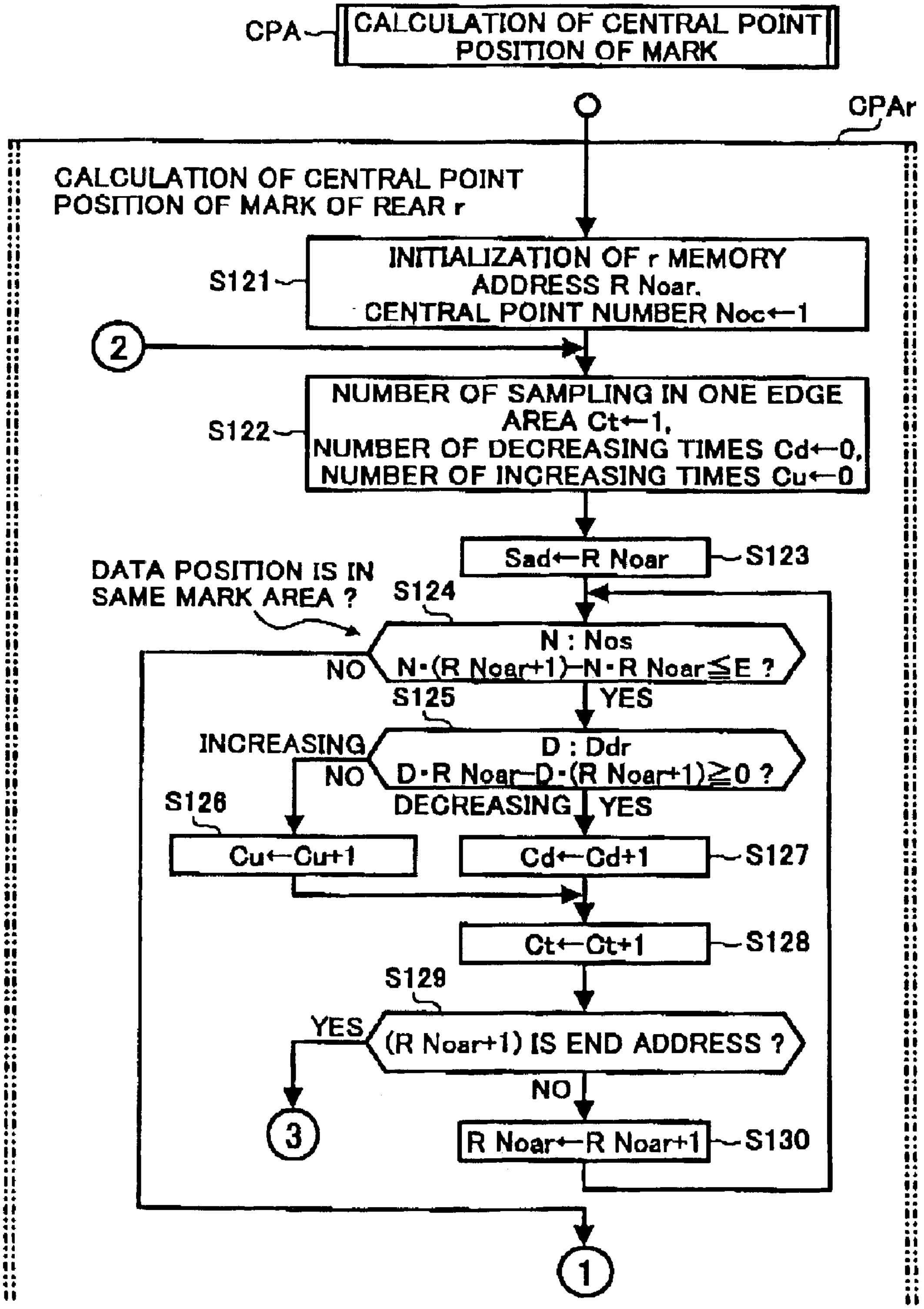
FIG. 11 is a flowchart illustrating a front half calculation obtaining a central point position of a mark.
Figure 12:
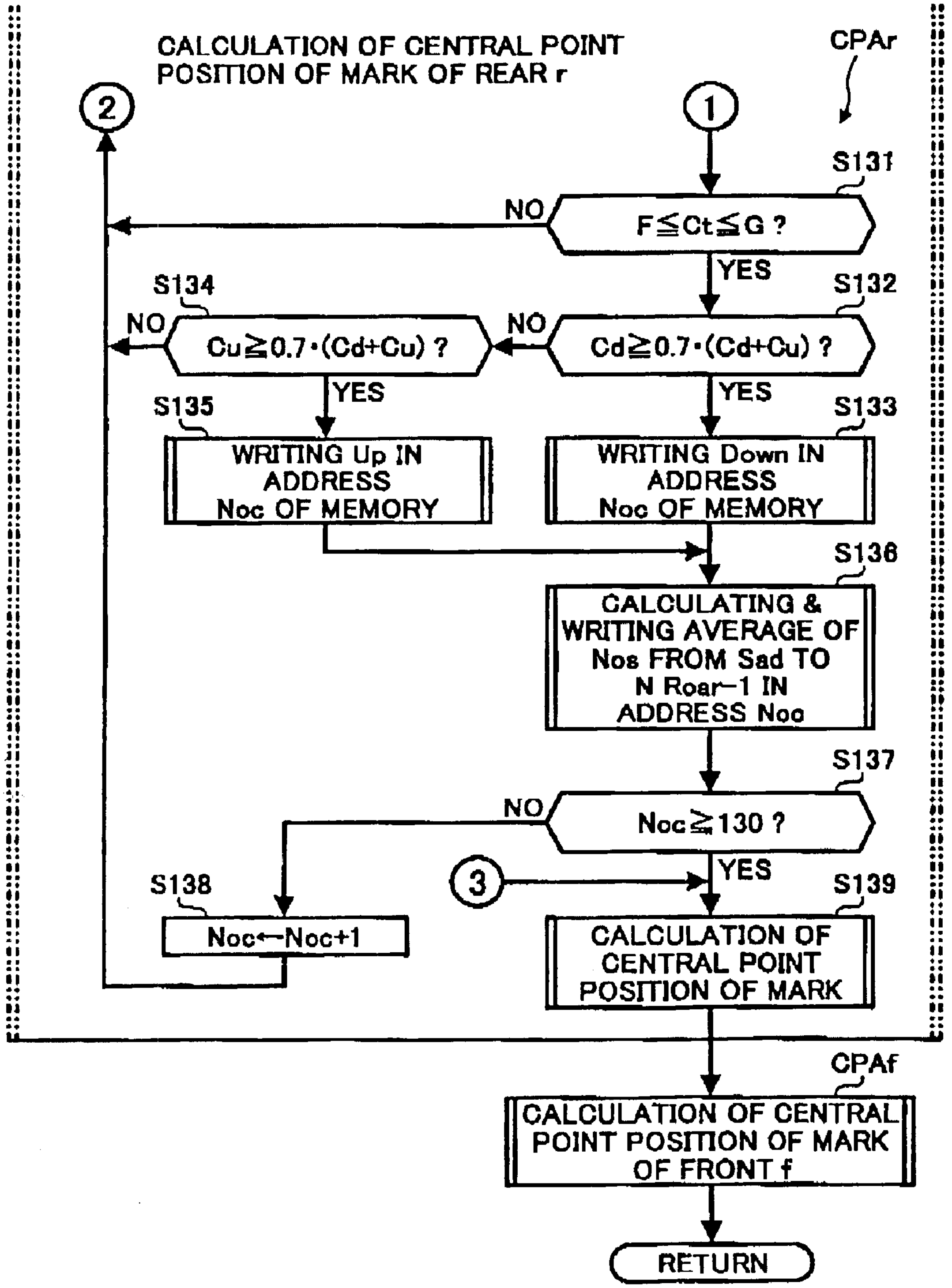
FIG. 12 is a flowchart illustrating a rear half calculation of the central point position of a mark.

Further, a central point Akrp located between a central position "a" of the declining region lowering a level of the mark detection signal, which ranges between two to three volt as illustrated in FIG. 14B, and a central position "b" of the next rising region raising the level serves as a central point of one mark Akr in the "y" direction. Similarly, a central point Ayrp located between a central position "c" of the declining region lowering a level of the appearing next mark detection signal and a central position "d" of the next rising region raising the level serves as a central point in the "y" direction of the other one mark Ayr. These mark central points Akrp, Ayrp, etc, are calculated when below described mark central point position is calculated (CPA) as illustrated in FIGS. 11 and 12.

Referring back to FIG. 9, after the last mark of the test patterns of the last eighth sets has passed through the optical sensors 20*r* and 20*f*, the timer Tw2 is checked if it is time out. If it is time out, the MPU 41 inhibits timer Tsp interruption operation. Thus, the A/D conversion of the detection signals Sdr and Sdf executed at the frequency of Tsp as illustrated in FIG. 10 is stopped.

The MPU 41 then calculates (CPA) a central position of the mark in accordance with the detection data Ddr and Ddf stored in the memories "r" and "f" of the FIFO memory of the MPU 41 so as to verify a rightness of distribution of the detected mark central point positions of the patterns of the eighth sets. An inappropriate detection pattern set is deleted (SPC), and an average pattern of the appropriate detection patterns is calculated (MPA) for each color.

Calculation of a mark central point position of the exemplary embodiment is now described in detail with reference to FIGS. 11 and 12. Both mark central point positions of rear and front marks "r" and "f" are typically calculated (CPAr and CPAf).

When the mark central point position of the rear side is to be calculated, the MPU 41 firstly initializes a read address Rnoar of the "r" memory assigned in the FIFO memory of the MPU 41, and also initializes data of the central point number register Noc also assigned therein to be a value representing a first edge region. Then, the MPU 41 initializes data "ct" of a first edge region inside sampling times register "Ct" also assigned therein to be one, and data Cd and Cu of declining times register "Cd" and rising times register "Cu" also assigned therein to be zero, respectively. Then, the MPU 41 reads reading address Rnoar in an edge region data band heading address register Sad assigned in the FIFO memory. The above-described operation serves as a preparation process for processing data of the first edge region.

The MPU 41 subsequently reads data (e.g. "y" position Nos: N·Rnoar, Detection level Ddr: D·RNoar) from the address Rnoar of the "r" memory, and data (e.g. "y" position Nos: N·Rnoar+1, Detection level Ddr: D·(Rnoar+1)) from the next address Rnoar+1. The MPU 41 then checks if a difference in the "y" positions of the both data is less than "E" (e.g. E=width of a mark/2, e.g. ½ mm) In other words, it is checked if both "y" positions are of edge regions of the same mark. If so, it is also checked if the mark detection data Ddr tends to decline or rise. If it tends to decline, the data Cd of the declining times register Cd is given an increment of one. In contrast, if it tends to rise, the data Cu of the rising times register Cu is given an increment of one. Then, the data Ct of the number of a one-edge region inside sampling times register Ct assigned in the FIFO memory is given an increment of one. It is then checked if the "r" memory reading address Rnoar is an end address of the memory. If it is not the end address, the reading address Rnoar is given an increment of one, and the above-described processes are repeated.

When the "y" position (Nos) of the read data is changed to the next, a difference of positions indicated by data stored in the front and rear memory addresses is checked in step 24 and is determined being larger than "E". The MPU 41 then goes from steps 131 to 139 of FIG. 12. In the step, tendency of declining or rising of the sampling data of one mark edge regions (i.e., leading and trailing edges) is entirely checked. Then, it is checked if the number of sampling time data Ct stored in the one edge inside sampling times register Ct ranges within a level corresponding to one edge region (i.e. a range of 2 to 3 volts). Specifically, it is checked if the following relation is met.

$$F \leqq Ct \leqq G \text{ (step 131)}$$

Legend "F" represents a lower limit set value of a number of times sample data Ddr is written in an "r" memory when both leading and trailing edge regions of a normally formed mark are detected and detection signals range from two to three volts. Legend "G" represents the upper limit setting value thereof.

When the Ct meets the following formula, rightness check of data of an edge region of one mark normally read and stored is completed, and its resulting consequence represents the rightness, it is checked if data band detected and obtained from the mark edge region tends to decline or rise as a whole of the edge region (ranging within two to three volts) (in steps S132 and S134).

$$F \leqq Ct \leqq G$$

In this example, when the data Cd of the declining times register Cd exceeds 70% of the sum of its own data Cd and data Cu of the rising times register Cu, information "Down" representing decline is written in an address for an edge region No. Noc of a memory (S133). In contrast, when the data Cu of the rising times register Cu exceeds 70% of the sum of its own data Cu and data Cd, information "Up" representing rise is written in an address for an edge No. Noc of a memory (S135). Further, an average of "y" positional data of the edge region (i.e., central point positions a, b, c, d etc.) is calculated and is written in an address for the edge No. Noc of the memory (S136).

Then, it is checked if the edge No. Nos is more than 130 in step 137. In other words, it is checked if central positions of the leading and trailing edge regions of all of the start mark Msr and eighth sets of mark patterns are entirely calculated (S137). When it is completed, or reading of all of storage data from the "r" memory is completed, a mark central point position is calculated based upon the edge region central position data (i.e., the "y" position calculated in step S136) (S139). Specifically, the edge No. and address data (i.e., decline and rise data and central point position data) are read, and it is then checked if a positional difference between the central point position of the precedent declining edge region and that of immediately after rising edge region ranges within the width "W" of the mark in the "y" direction. If it deviates therefrom, these data are deleted. If it ranges therebetween, an average of these data is written in a memory having a mark No. numbered from the head as a central point position of one mark. If all of the mark formation, measurement, and processing of measured data are appropriate, a start mark Msr and eighth sets of marks (e.g. one set of eighth marks multiplied by eight sets equals 64 marks), totally 65 items of the mark central point positional data, are obtained for the rear "r" and are stored in the memory.

Subsequently, the MPU 41 similarly executes calculation of a mark central point position of a front "f" (CPAf), and similarly applies data processing of calculating the mark central point position of the rear "r" (CPAr) to measured data stored in the "f" memory. In the exemplary embodiment, if all of the mark formation, measurement, and processing of the measured data are appropriate for the front "f", a start mark Msf and eighth sets of marks (64 marks), totally 65 items of the mark central point positional data, are obtained and stored in the memory.

Referring back to FIG. 9, after the mark central point position is calculated as mentioned above, the MPU 41 then verifies (SPC) if the mark central point position data band stored in the memory indicates central point distribution corresponding to mark distribution of FIG. 5 in the next step of verifying patterns of respective sets of marks. Then, data deviated from the mark distribution of FIG. 5 is deleted per a unit of a set. Specifically, data set (one set including eight positional data bands) showing the distribution patterns corresponding to that of FIG. 5 is only remained. When these are entirely appropriate, data of the eight sets main in the rear "r" and front "f" sides.

Subsequently, the MPU 41 initially changes the respective central point positional data of the first marks of the second and subsequent sets of the rear "r" side data to be data equal to the central point positional data of the first mark of the first mark set. The MPU 41 then similarly changes the respective central point positional data of the second to eighth marks of the second and subsequent mark sets by the same changing amount so as to obtain respective displacements of marks of the second to eighth sets. Specifically, the central point position bands of the respective second and subsequent sets are changed to shift in the "y" direction so as to enable leading ends of the respective marks sets to coincide with that of the first set. The central point position data of the second and subsequent marks formed on the front "f" side are also similarly changed.

Then, when obtaining the average patterns of MPA, the MPU 41 calculates averages Mar to Mhr (FIG. 15) of the central point position data of respective color marks of the entire sets in the rear "r" side. The MPU 41 also calculates averages Maf to Mhf (FIG. 15) of the central point position data of respective color marks of the entire sets in the front "f" side. These averages represent central point positions of virtual average positional marks of MAkr (representative of a rear orthogonal mark of Bk), MAyr (representative of a rear orthogonal mark of Y), MAcr (representative of a rear orthogonal mark of C), MAmr (representative of a rear orthogonal mark of M), MBkr (representative of a rear oblique mark of Bk), MByr (representative of a rear oblique mark of Y), MBcr (representative of a rear oblique mark of C), MBmr (representative of a rear oblique mark of M), MAkf (representative of a front orthogonal mark of Bk), MAyf (representative of a front orthogonal mark of Y), MAcf (representative of a front orthogonal mark of C), MAmf (representative of a front orthogonal mark of M), MBkf (representative of a front oblique mark of Bk), MByf (representative of a front oblique mark of Y), MBcf (representative of a front oblique mark of C), and MBmf (representative of a front oblique mark of M), distributed as illustrated in FIG. 15.

Figure 15:
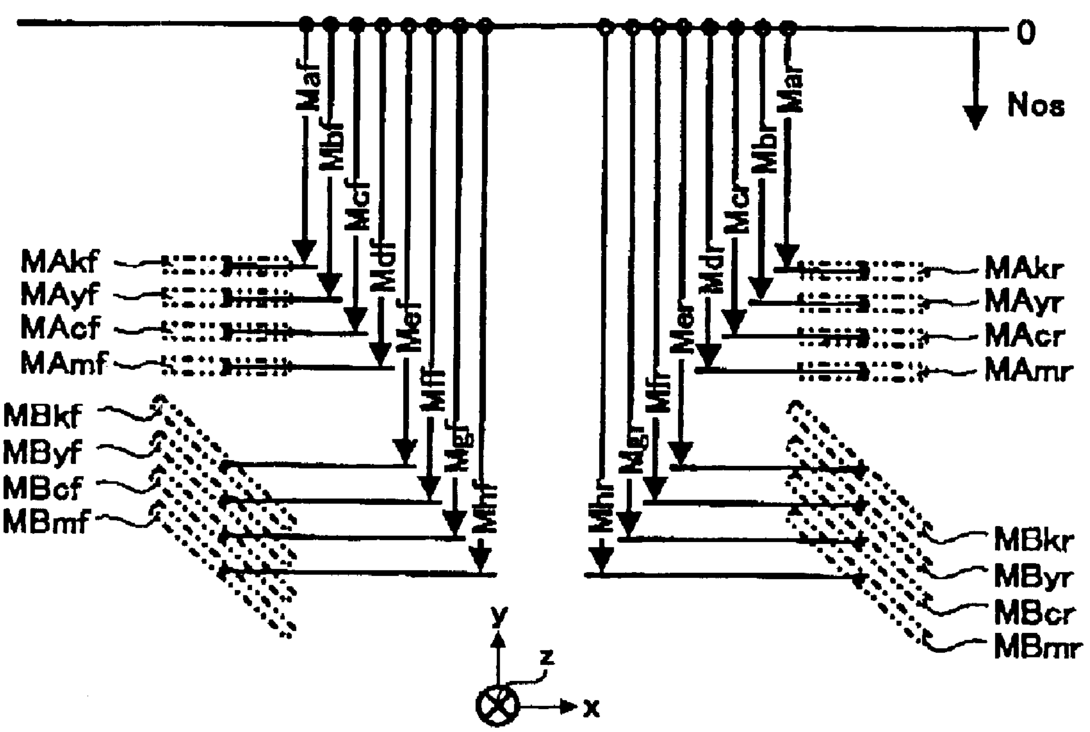
FIG. 15 is a plan view illustrating a train of average data bands of Mar, . . . , each calculated using average pattern calculation "MPA" illustrated in FIG. 9 and hypothetical marks Makr, . . . , having the average data at its central point position.

Referring back to FIG. 8BA together with FIG. 15, the MPU 41 calculates image formation displacement of FIG. 8BA as described bellow. Calculation of a displacement of Y image formation (Acy) is now typically described.

A sub-scanning displacement dyy, specifically, a displacement of a difference (Mbr−Mar) between central point positions of the Bk and Y orthogonal marks MAkr and MAyr in the rear "r" side from the reference value "d" (FIG. 5) is calculated by the following formula:

$$Dyy=(Mbr-Mar)-d$$

Also, a main scanning direction displacement dxy, specifically, a displacement of a difference (Mfr−Mbr) between central point positions of the orthogonal marks MAyr and MByr in the rear "r" side from the reference value "4d" (FIG. 5) is calculated by the following formula:

$$dxyr=(Mfr-Mbr)-4d$$

In addition, a displacement of a difference (Mff−Mbf) between central point positions of the orthogonal marks MAyf and MByf in the front "f" side from the reference value "4d" (FIG. 5) is calculated as an average with dxyf (=(Mff−Mbf)−4d) by the following formula:

$$Dxy=(dxyr+dxyf)/2=(Mfr-Mbr+Mff-Mbf-8d)/2$$

Also, a skew dSqy, specifically, a displacement of a difference between central point positions of the orthogonal marks MAyr and MAyf in the rear "r" side is calculated by the following formula:

$$Dsqy=(Mbf-Mbr)$$

Also, a displacement dLxy of a main scanning line length, specifically, an amount obtained by subtracting askew dSqy (i.e., Mff−Mfr) from a difference (Mff−Mfr) between central point positions of the oblique marks MByr of the rear "r" side and the oblique marks MByf of the front "f" side is calculated by the following formula:

$$Dlxy=(Mff-Mfr)-dsqy=(Mff-Mfr)-(Mbf-Mbr)$$

respective calculations of displacements of respective C and M image formation (Acc, Acm) are similarly performed with that of the Y image formation. Calculation of a displacement of Bk image formation is also similarly performed. However, since a color matching operation in the sub-scanning direction "y" is performed on the basis of Bk as a reference, a displacement dyk in the sub-scanning direction is not calculated for the Bk (Ack).

The MPU 41 adjusts image formation displacements of respective colors in accordance with the calculated displacements (DAD) as described below. Typically, an example of adjusting a displacement cause in a "Y" color (Ady) is described.

In the exemplary embodiment, in order to adjust a sub-scanning displacement dyy, a time for starting image exposure (i.e., latent image formation) for forming a "Y" toner image is adjusted in accordance with the calculated displacement dyy from the reference time (in the direction "Y").

In order to adjust a main scanning displacement dxy, a time for delivering image data of a line head to an exposure laser modulator included in the writing unit 5 in a X direction with regard to a line synchronization signal representing a line head image formation) for forming a "Y" toner image is set being displaced by the calculated displacement dxy from the reference time for image exposure (latent image formation) for Y-toner color image formation.

In order to adjust a skew dsqy, a rear side of a mirror of the writing unit 5, which is opposed to the PC drum 6*b* and extending in an "x" direction so as to reflect and incident a laser beam modulated by a "Y" image data, is pivotally supported. The front side is also supported by a block that is slidable in the "y" direction. The skew dsqy can be adjusted by a "y" driving mechanism mainly including a pulse motor and screw while driving back and forth. In order to adjust the skew dsqy, the block is driven by a prescribed amount in accordance with the calculated skew dsqy using the pulse motor.

In order to adjust the displacement dLxy of the main scanning line length, a frequency of a pixel synchronization clock providing image data on a line in a unit of a pixel is set to be a reference frequency xLs/(Ls+dLxy) wherein the legend "s" represents the reference line length. The other image formation displacements of C and Y colors are adjusted in a similar manner with that performed in the above-described Y color adjustment. The adjustment of the Bk color is almost similar therewith. However, since a color matching operation in the sub-scanning direction "y" is performed on the basis of the Bk color as a reference, a displacement dyk in the sub-scanning direction is not calculated for the Bk color (Ack). Until the next color matching, the color image formation is performed under such adjustment conditions.

As mentioned above, since respective first to fourth mark sets are formed at applicable positions of the peripheral surface of the PC drum, and respective fifth to eighth mark sets are formed at substantially the same positions to those of the respective first to fourth mark sets, detection data sufficient to calculate a displacement average can be obtained even if few mark detection slippage occurs. Since only read mark data ranging from two to three volt are extracted and stored in a memory as an edge region data as illustrated in FIG. 14B, and central points Akrp and Ayrp are calculated and regarded as mark positions on the basis of central point positions "a" and "c" of the declining edge region and those "b" and "d" of the rising edge region as shown in FIG. 14B, the mark detection can be precise almost due to avoidance of mark detection slippage and erroneous detection of a noise of a mark.

Further, in addition to that, when a transfer belt includes no stain and cut, all of marks included in the first to fourth mark sets can be fairly detected. Then, if a number of the color matching operation (CPA) times is counted and accumulated in the non-volatile memory, and only a start mark and first to fourth mark sets can be formed on the transfer belt 10 so as to calculate color displacements until the number reaches a prescribed level. In contrast, all of the start mark and first to eight mark sets can be formed on the transfer belt 10 so as to calculate color displacements when the number exceeds the prescribed level.

As a result, a risk of erroneously detecting noise as a mark, which is caused when a condition of extracting the mark is restricted, can be suppressed. During a term when test patterns of only first to fourth mark sets are formed, a time period for performing the color matching (CPA) is relatively short.

Figure 17:
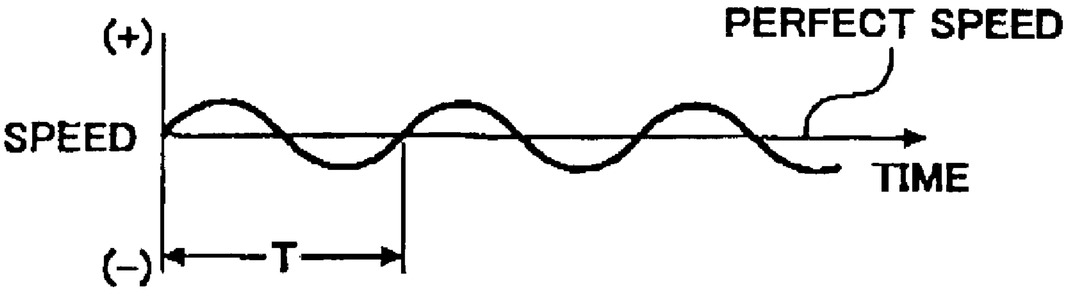
FIG. 17 is a chart illustrating a change in speed of the transfer belt over a time period T.

As mentioned above, since test patterns for position detection use are transferred to the transfer belt 10, and read by the optical sensors 20*f* and 20*r*, a writing position displacement of the wiring unit 5 relative to the PC drums with 6*a*, 6*b*, 6*c* and 6*d*, writing inclination and magnification error or the like can be detected. Simultaneously, writing times of the writing units 5 writing to the respective PC drums are adjusted so as to eliminate or suppress color deviation caused by those errors. However, when there exists eccentricity in a driving roller 9 driving the transfer belt 10 after its processing and assembling, a moving speed of the transfer belt 10 cannot be constant. Specifically, the moving speed varies in a sine wave state at a frequency "T" of one rotation of the driving roller 9 as illustrated in FIG. 17. Such eccentricity is generally caused by vibrations of the roller surface about the roller shaft and that of pulley or the like attached to the shaft for rotating the roller shaft.

Figure 18:
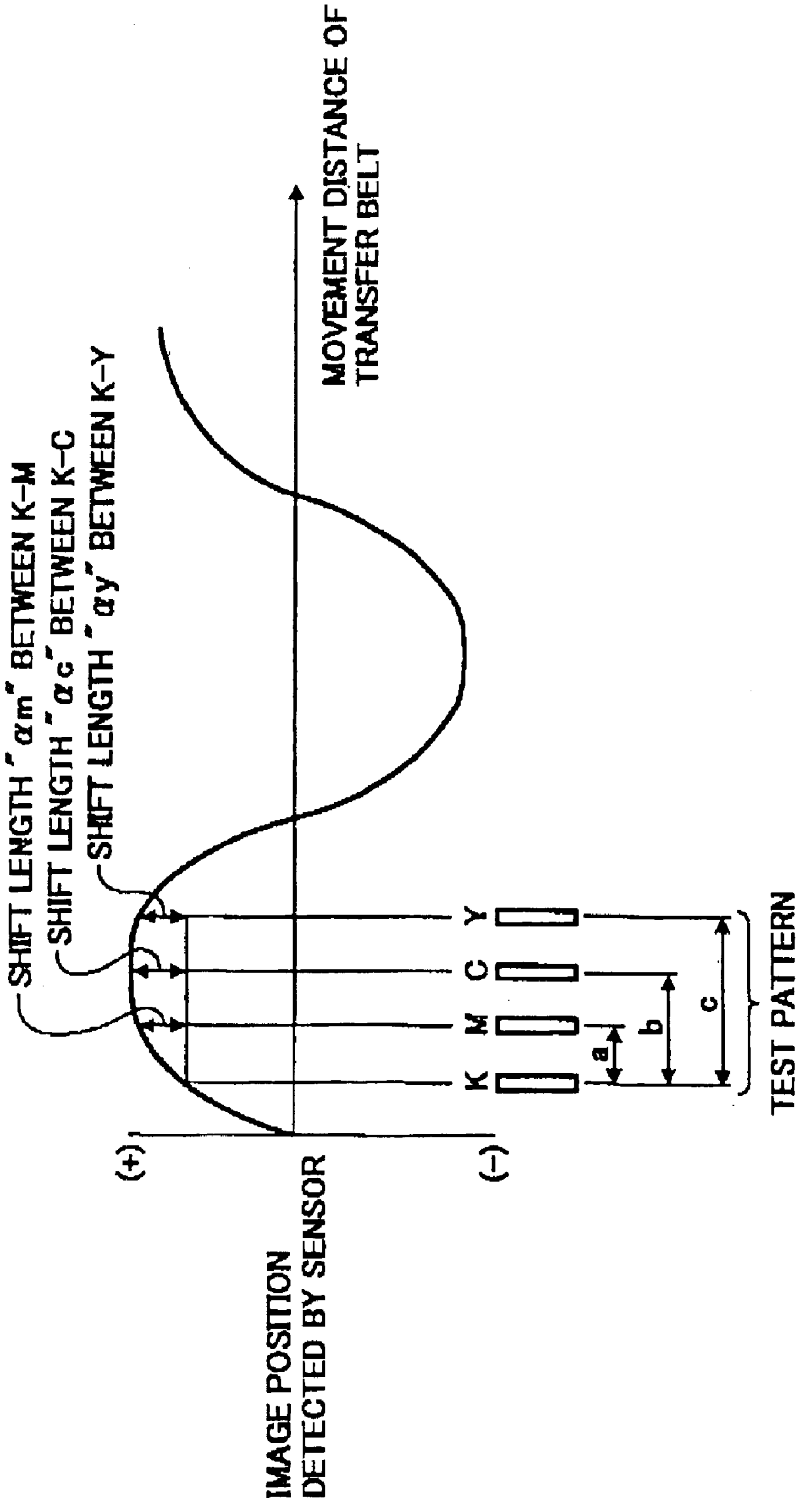
FIG. 18 is a chart illustrating an operation of reading an error caused by eccentricity of a driving roller of the transfer belt.

However, since toner marks of the test patterns are transferred and then conveyed by the transfer belt in analog state, the optical sensors unavoidably erroneously read thereof as illustrated in FIG. 18. Even if distances between respective colors of the test patterns on the transfer belt 10 are, for example, "a" between K and M, "b" between K and C, and "c" between K and Y, these are unavoidably detected including errors $\alpha m$, $\alpha c$ and $\alpha y$, respectively, caused by the belt variation. As a result, the relation between the respective color toner marks K and M, K and C, and K and Y are determined as being displaced to amounts of $a+\alpha m$, $b+\alpha c$, and $c+\alpha y$. Accordingly, highly precise positional displacement correction is disturbed.

Figure 19:
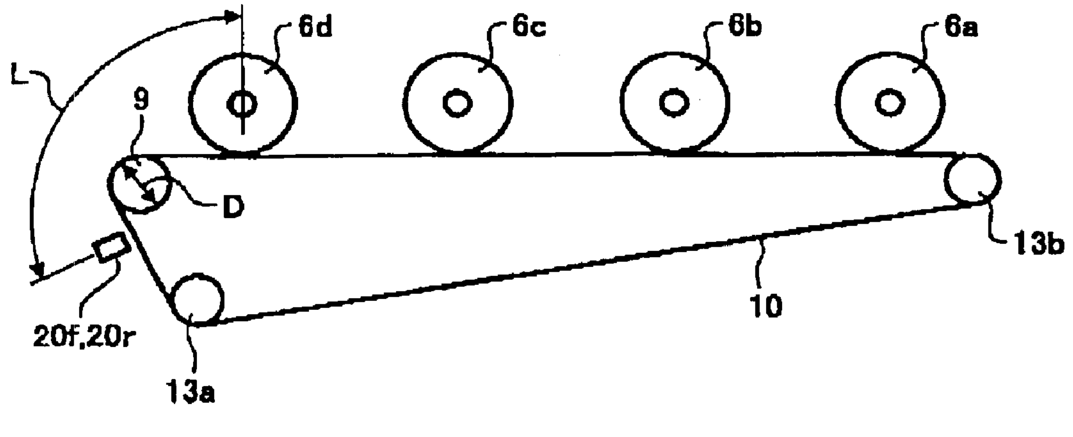
FIG. 19 is a schematic diagram illustrating a relation between the PC drum and optical sensor.

Then, in this embodiment, distances of the optical sensors 20*f* and 20*r* serving as pattern detection sensors from a transfer position, where a test pattern is transferred to the transfer belt 10, are set to levels obtained by multiplying a distance that the transfer belt 10 is conveyed when the driving roller 9 rotates once by an integer number. Thus, the belt variation caused by the eccentricity of the driving roller 9 can be cancelled when test patterns are detected at the sensor positions as illustrated with reference to FIG. 19.

As there shown, when a diameter of the driving 6 roller 9 is represented by "D", a distance between a transfer position of a PC drum 6*d* serving as a final transfer station and optical sensors 20*f* and 20*r*/on a transfer belt surface is represented by "L", the "L" is set so as to meet the following relation, wherein legend "n" represents an integer number:

$$L=\pi\times D\times n$$

Figure 20:
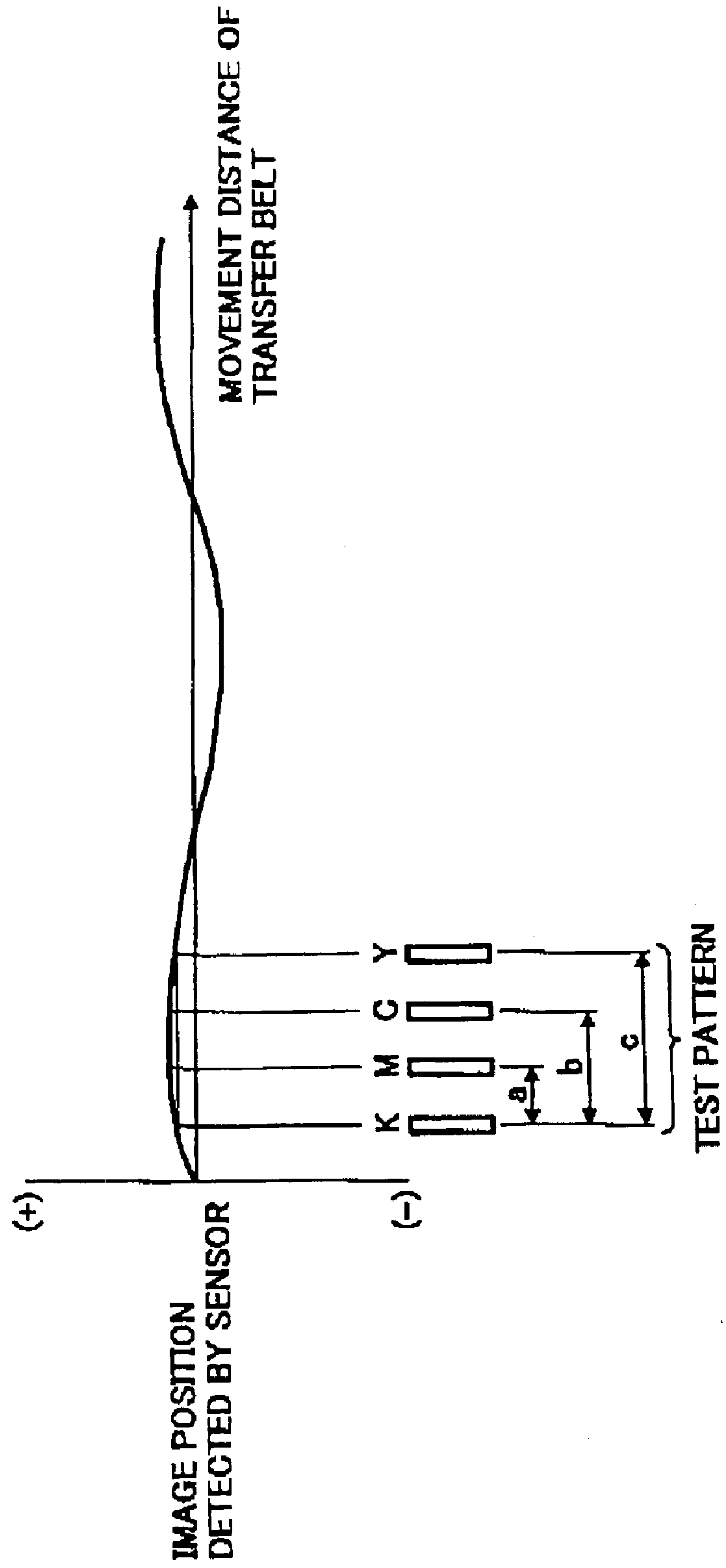
FIG. 20 is a chart illustrating a change in a speed of the transfer belt.

Thus, when such a positional relation is established, variation caused by a frequency of one rotation of the driving roller 9 at the optical sensors 20*r* and 20*f* can be cancelled. Specifically, since a speed variation of the transfer belt 10 caused by eccentricity of a driving roller 9 is cancelled, a speed variation of the transfer belt is minimized as illustrated in FIG. 20. As a result, since error caused by the belt variation is eliminated, a test pattern can be precisely detected at positions of optical sensors 20*f* and 20*r*.

This application is based on Japanese Patent Application No. JP 2002-162101, filed Jun. 3, 2003, the contents of which are hereby incorporated by reference herein.

Obviously numerous additional modifications and variations of the present invention are possible in light of the above teachings. It is therefore to be understood that within the scope of the appended claims, the present invention may be practiced otherwise than as specifically described herein.

What is claimed is:

1. A method for detecting color offset, comprising:

forming different color visual images on a photosensitive member;

providing a transfer medium driven by a driving roller and configured to receive at a transfer section from the photosensitive member and superpose the different color visual images, said transfer medium transferring the different color visual images to a transfer sheet;

forming a plurality of mark sets on the transfer medium, each of said mark sets being formed from a set of different color marks aligned in a movement direction;

detecting respective marks with at least one sensor;

calculating an average of displacements of respective different color marks from a reference position; and positioning the at least one sensor away from the transfer section by a prescribed length along the transfer medium, said prescribed length being calculated by multiplying (i) a conveyance length the transfer medium travels when the driving roller rotates once and (ii) an integer number.

2. The method according to claim 1, wherein said forming a plurality of mark sets includes forming same color marks in a cycle of a three quarter peripheral length of the photosensitive member.

3. The method according to claim 1, wherein said forming a plurality of mark sets includes the step of forming four and eight mark sets.

4. A color offset detecting apparatus, comprising:

a mark sets forming device configured to form a plurality of mark sets on a transfer medium, and configured to superimpose and transfer different color visual images to a transfer sheet, each of said plurality of mark sets being formed from a set of different color marks aligned in a transfer medium movement direction;

at least one sensor configured to detect the marks, said at least one sensor being distanced from a transfer position where the different color visual images are transferred by a prescribed length along the transfer medium, said prescribed length being calculated by multiplying (i) a conveyance length that the transfer medium travels when a driving roller rotates once and (ii) an integer number, wherein the driving roller drives the transfer medium;

a data storage device configured to store detection data detected by the at least one sensor together with corresponding positional data; and a calculation device configured to calculate averages of displacements of same marks from a reference position in accordance with the detection and positional data.

5. A color image forming apparatus for forming different color visual images on a photosensitive member to be superposed and transferred to a transfer sheet via a transfer medium rotated by a driving roller, said color image forming apparatus comprising:

a mark set forming device configured to form a plurality of mark sets on the transfer medium, each of said plurality of mark sets being formed from a set of different color marks aligned in a movement direction of the transfer medium;

at least one sensor configured to detect marks, said at least one sensor being distanced from a transfer position where the different color visual images are transferred by a prescribed length along the transfer medium, said prescribed length being calculated by multiplying (i) a conveyance length that the transfer medium travels when the driving roller rotates once and (ii) an integer number;

an A/D converting device configured to convert a detection signal of the at least one sensor into detection data;

a memory configured to store the detection data;

a data storing device configured to store the detection data with corresponding positional data in the memory;

a calculation device configured to calculate an average of displacements of the same color marks from a reference position in accordance with the detection data and a color-matching device configured to adjust respective image formation times in accordance with the averaged displacements.

6. The color image forming apparatus according to claim 5, wherein said color image forming apparatus includes a tandem drum system.

* * * * *

UNITED STATES PATENT AND TRADEMARK OFFICE

CERTIFICATE OF CORRECTION

PATENT NO. : 6,920,303 B2
DATED : July 19, 2005
INVENTOR(S) : Yamanaka et al.

It is certified that error appears in the above-identified patent and that said Letters Patent is hereby corrected as shown below:

Title page,
Item [30], should read:
-- [30] Foreign Application Priority Data
Jun. 3, 2002 (JP) ..................... 2002-162101 --.

Signed and Sealed this

Twentieth Day of September, 2005

JON W. DUDAS
*Director of the United States Patent and Trademark Office*